(12) United States Patent
Kikugawa

(10) Patent No.: US 7,739,523 B2
(45) Date of Patent: Jun. 15, 2010

(54) DISPLAY SYSTEM, ACCESS POINT OF DISPLAY SYSTEM, AND POWER CONTROL METHOD

(75) Inventor: Noriyuki Kikugawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1826 days.

(21) Appl. No.: 10/800,324

(22) Filed: Mar. 12, 2004

(65) Prior Publication Data

US 2004/0187041 A1  Sep. 23, 2004

(30) Foreign Application Priority Data

| Mar. 17, 2003 | (JP) | 2003-072026 |
| Mar. 31, 2003 | (JP) | 2003-097190 |
| Jul. 7, 2003 | (JP) | 2003-193020 |

(51) Int. Cl.
  *G06F 1/00* (2006.01)
  *G06F 1/26* (2006.01)
  *G06F 3/033* (2006.01)
  *G06G 5/00* (2006.01)

(52) U.S. Cl. ............... 713/300; 713/310; 713/320; 345/211; 345/213

(58) Field of Classification Search ........... 713/300, 713/310, 320; 345/211, 213
See application file for complete search history.

(56) References Cited

U.S. PATENT DOCUMENTS

| 4,677,566 A | * | 6/1987 | Whittaker et al. ........... 700/295 |
| 5,675,364 A | * | 10/1997 | Stedman et al. ............. 345/211 |
| 5,764,547 A | * | 6/1998 | Bilich et al. ................. 713/321 |
| 6,125,449 A | * | 9/2000 | Taylor et al. ................ 713/310 |
| 6,275,221 B1 | * | 8/2001 | Song .......................... 345/211 |
| 6,425,040 B1 | | 7/2002 | Dewa et al. |
| 6,445,363 B1 | | 9/2002 | Urisaka |

(Continued)

FOREIGN PATENT DOCUMENTS

JP  07-333571  12/1995

(Continued)

OTHER PUBLICATIONS

"Device Class Power Management Reference Specification—Network Device Class"; Oct. 12, 2000; (13 pages).

*Primary Examiner*—Vincent T Tran
(74) *Attorney, Agent, or Firm*—Cowan, Liebowitz & Latman, P.C.

(57) ABSTRACT

Provided is a system including a computer, a display device for performing display based on a signal from the computer, and an access point for performing communication between a wired network and a wireless network and disposed between the computer and the display device. In response to operation for turning ON the display device or to a power ON instruction from another client device, the access point is activated and sends an activation signal for activating the computer. Upon receiving the activation signal, the computer is activated and outputs a signal to the display device. Further, in response to operation for turning OFF the display device or to a power OFF instruction from another client device, the access point sends a power shutoff signal to the computer and shuts off its own power. Upon detecting the power shutoff signal, the computer performs a shutdown process. When the signal from the computer stops being received, the display device shuts off its own power.

7 Claims, 27 Drawing Sheets

U.S. PATENT DOCUMENTS

| | | | |
|---|---|---|---|
| 6,804,591 B1 * | 10/2004 | Miyazawa | 701/36 |
| 7,034,814 B2 * | 4/2006 | Gong et al. | 345/211 |
| 2001/0016918 A1 * | 8/2001 | Alexander et al. | 713/323 |
| 2002/0113907 A1 * | 8/2002 | Endo et al. | 348/730 |
| 2003/0146884 A1 * | 8/2003 | Heo | 345/30 |

FOREIGN PATENT DOCUMENTS

| | | |
|---|---|---|
| JP | 11-212682 | 8/1999 |
| JP | 11-212682 A | 8/1999 |
| JP | 11-345043 A | 12/1999 |
| JP | 2000-99414 A | 4/2000 |
| JP | 2000-241752 A | 9/2000 |
| JP | 2001-159935 A | 6/2001 |
| JP | 2001-216118 A | 8/2001 |
| JP | 2001-216119 A | 8/2001 |
| JP | 2002-175254 | 6/2002 |

* cited by examiner

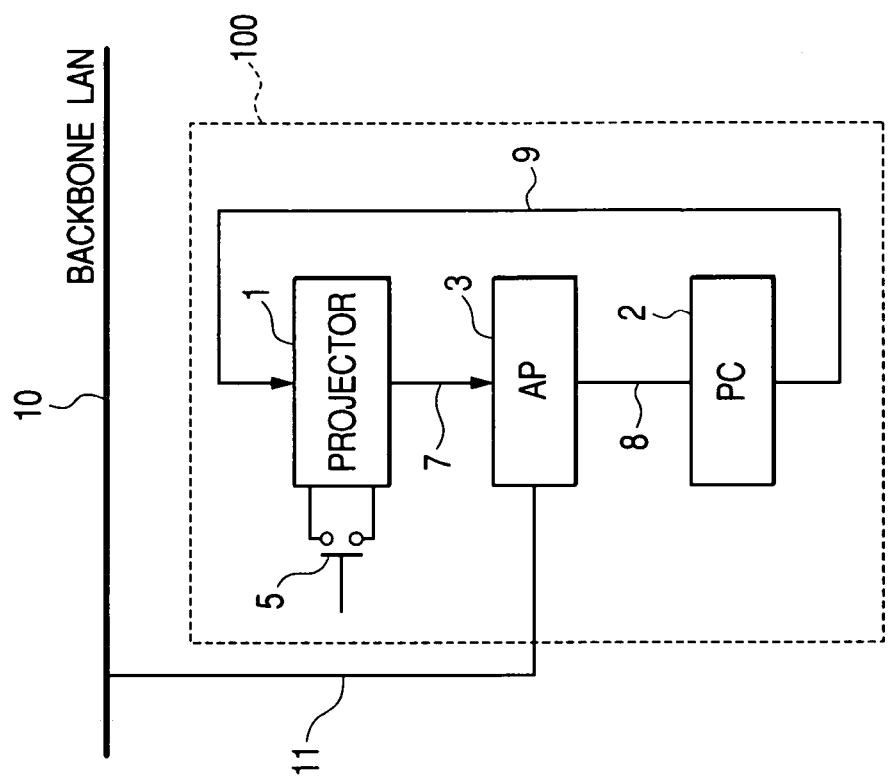
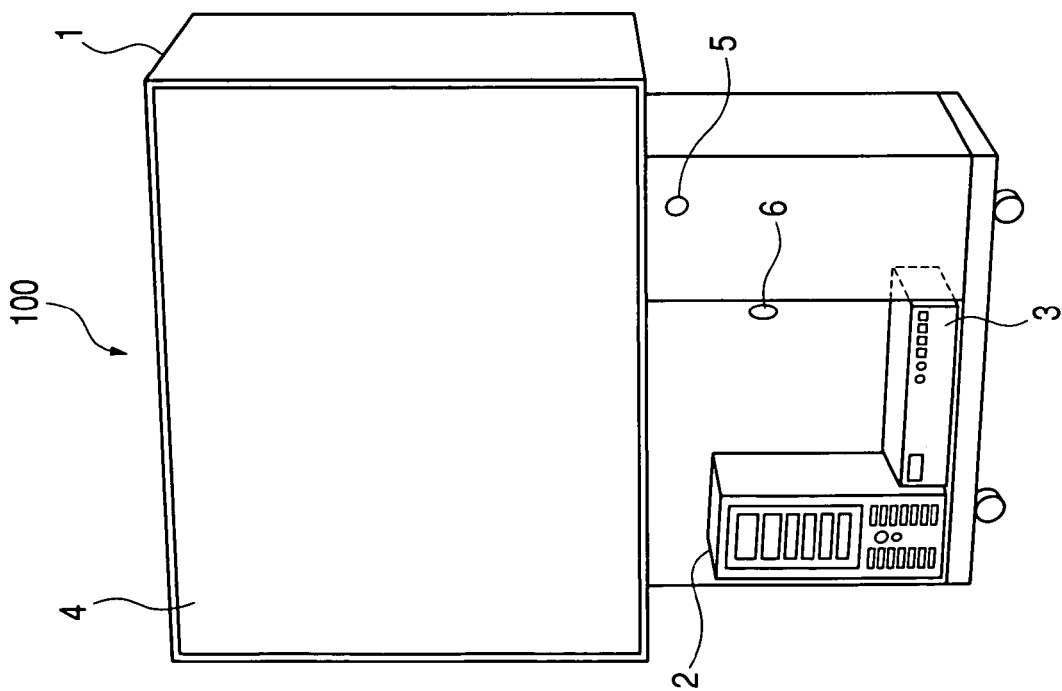

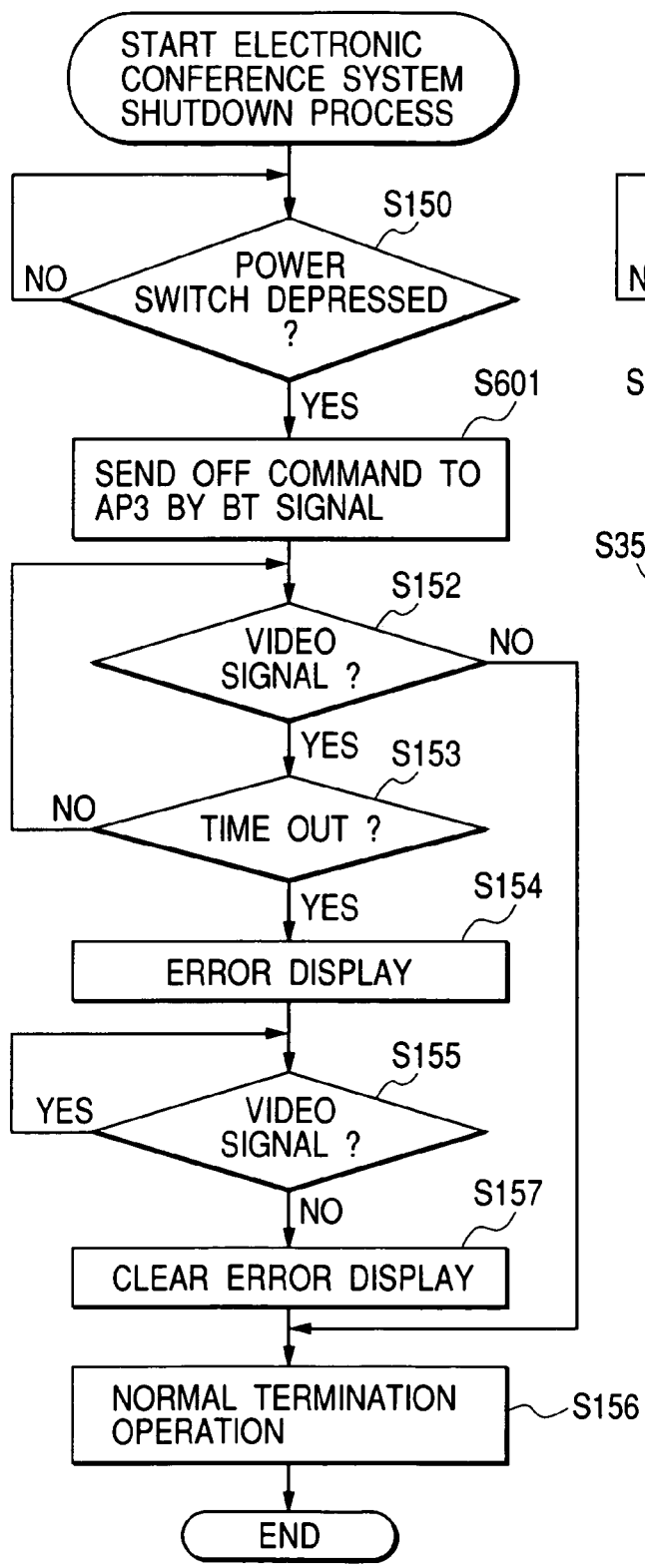
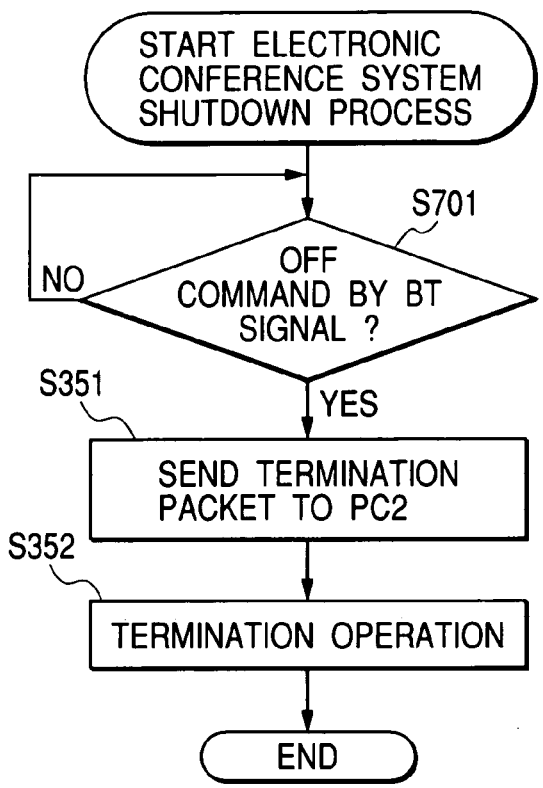
FIG. 16
FIG. 17

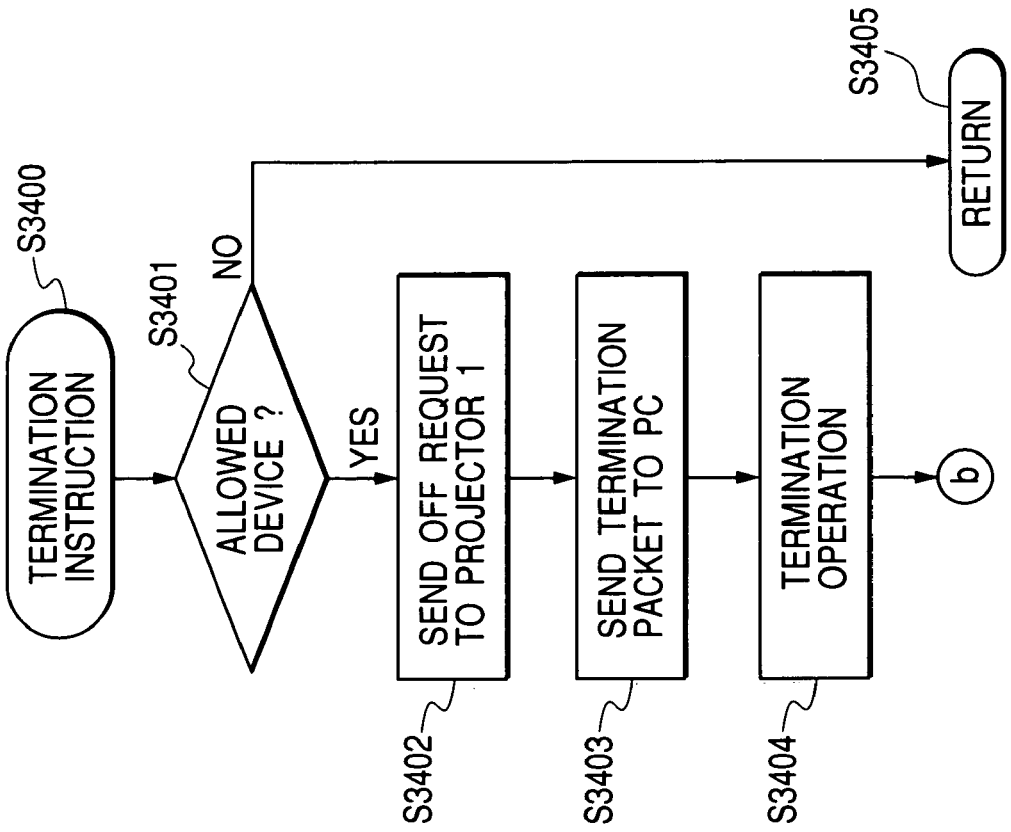
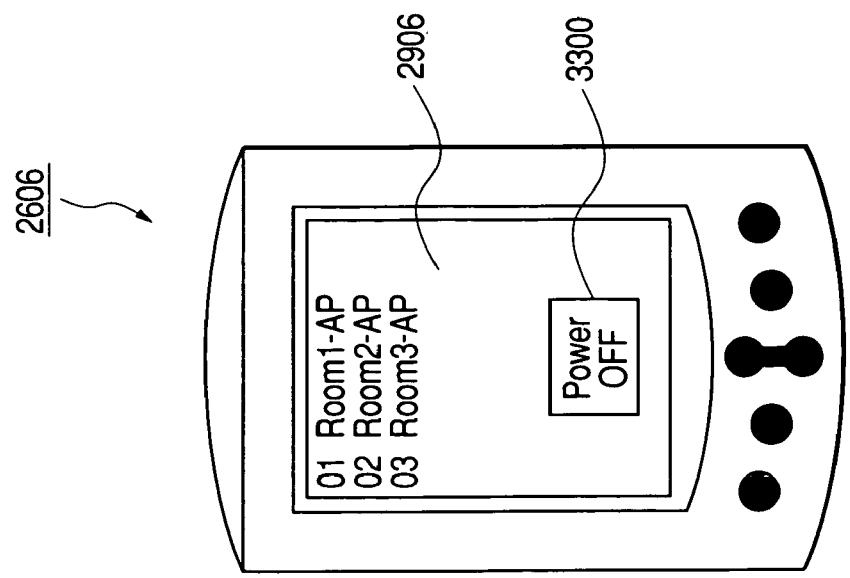

DISPLAY SYSTEM, ACCESS POINT OF DISPLAY SYSTEM, AND POWER CONTROL METHOD

BACKGROUND OF THE INVENTION

1. Field of the Invention

The present invention relates to a system including an information processor, a display device for performing display based on a signal from the information processor, and an access point. The present invention also relates to an access point and to a power control method for the system or the access point.

2. Related Background Art

In recent years, there is proposed an electronic conference system or the like for sharing display images with a large-screen display such as a front projector, a rear projector, or a plasma display, being placed at the center.

Such an electronic conference system generally includes a personal computer (PC) connected to the large-screen display, a client device for sending to the PC a file for display, and an access point device (AP) for mediating between the PC and the client device.

As a method of remotely turning ON power of the PC, there is proposed a technique called "Wake on LAN". With the technique, standby power is supplied to a LAN controller even when the power of the PC is in an off state (a state where AC power is supplied), only a particular activation instructing packet is scanned, and upon the reception thereof, the main power of the system is turned ON.

There is also proposed a technique with which power information is collectively obtained on a plurality of image forming apparatuses connected to a network, power of image forming apparatuses can be respectively set to ON or OFF, and unified management and control of usage conditions are performed on the respective image forming apparatuses.

However, according to the above-mentioned conventional arts, in the case where the system includes a display, an AP, and a PC, respective power switches of the display, the AP, and the PC need to be separately turned ON. Although there exists a model of the AP that has no power switch, the power switches of the display and the PC still need to be separately turned ON. In particular, in the case where the large-screen display such as a rear projector has a large casing, the PC and the AP are often disposed inside the casing, making it difficult to operate the power switches of the PC and the AP.

Also, in order to use Wake on LAN to remotely turn ON the power of the PC, a different PC is generally used for sending out the activation instructing packet, raising a problem of the bloated system.

Further, it is necessary that a MAC address of the LAN controller used in a PC on an activated side is designated in the activation instructing packet. It is thus difficult for a device having no input means such as an AP to realize a Wake on LAN function.

SUMMARY OF THE INVENTION

The present invention has an object to solve the problems raised by the above-mentioned conventional arts.

Another object of the present invention is to utilize, for example, a Wake on LAN function to perform power control efficiently on a plurality of devices such as a display, an AP, and a PC.

Further another object of the present invention is to perform ganged control of respective powers of a system including the display, the AP, and the PC with simple operation.

Further another object of the present invention is to provide an access point device that includes the Wake on LAN function and in which an address of an information processor on an activated side can be set with ease.

Other objects of the present invention will become apparent from the following specification and the accompanying drawings.

BRIEF DESCRIPTION OF THE DRAWINGS

FIG. 1 is a schematic diagram of a display system according to first, second, and fourth embodiments of the present invention;

FIG. 2 is a block diagram showing a configuration of the display system according to first and second embodiments of the present invention;

FIG. 16 is a flow chart of a shutdown process for the projector according to the second embodiment of the present invention;

FIG. 17 is a flow chart of a shutdown process for the access point according to the second embodiment of the present invention;

FIG. 33 is a diagram showing a screen display example during execution of a program for allowing the user to instruct shutdown of the system by use of the PDA according to the fourth embodiment of the present invention;

FIG. 34 is a flow chart of a shutdown process for the access point according to the fourth embodiment of the present invention.

DESCRIPTION OF THE PREFERRED EMBODIMENTS

First Embodiment

Figure 3:
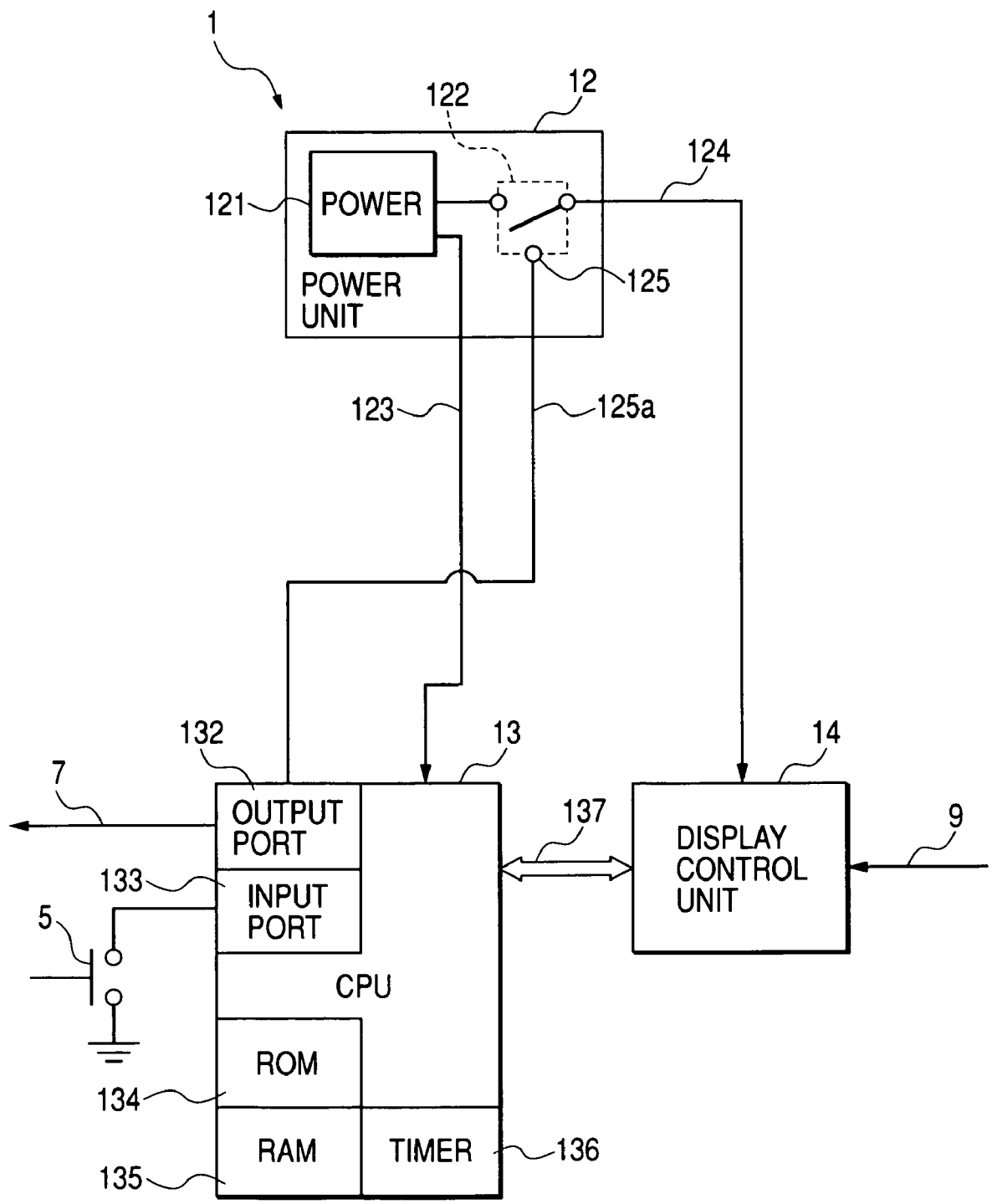
FIG. 3 is a block diagram showing a configuration of a projector according to the first embodiment and a third embodiment of the present invention.

Hereinafter, an electronic conference system according to a first embodiment of the present invention will be described in detail with reference to the drawings.

FIG. 1 is an external perspective view of the electronic conference system according to this embodiment of the present invention.

In FIG. 1, an electronic conference system 100 includes: a projector 1 (display); a personal computer (hereinafter, referred to as "PC") 2; and an access point (hereinafter, referred to as "AP") 3 connected to a backbone LAN 10 (see FIG. 2), the PC 2, and a wireless client device (not shown).

The system allows the projector 1 to display an image from the PC 2, and permits the control of the PC 2 by the operation of a wireless client device through the intermediation of the AP 3.

The AP 3 is wirelessly connected to the client device (not shown) and connected to the PC 2 and the backbone LAN 10 by wires, while managing data transfer between one another.

In response to the operation of the wireless client device via the AP 3, the PC 2 sends/receives a file to/from a server computer (not shown) connected to the backbone LAN 10 via the AP 3 as well, or converts a file of its own into a video signal and sends the signal to the projector 1.

The projector 1 includes: a display area 4; a power switch 5 for switching ON/OFF of power when depressed; and a storage unit 6. The display area 4 is a place where the video signal sent from the PC 2 is outputted. The storage unit 6 stores the PC 2 and the AP 3 inside its casing. According to this arrangement, the entire electronic conference system 100 can be reduced in size.

FIG. 2 is a block diagram showing a schematic configuration of the electronic conference system 100 of FIG. 1.

In FIG. 2, the electronic conference system 100 includes: a wired line 7 through which a power ON request signal or a power OFF request signal is sent from the projector 1 to the AP 3; a wired line 8 through which data is sent/received by a LAN signal between the AP 3 and the PC 2; a wired line 9 through which an output video signal is sent from the PC 2 to the projector 1; and a wired line 11 through which data is sent/received by a LAN signal between the AP 3 and the server computer (not shown) connected to the backbone LAN 10.

The signal sent through the wired line 7, more specifically, becomes the power ON request signal at a HIGH level and the power OFF request signal at a LOW level. Alternatively, the signal may be discriminated between the power ON request signal and the power OFF request signal based on the kind of pulse train.

The wired line 11 is used, more specifically, for sending a file from the server computer connected to the backbone LAN 10 to the PC 2 via the AP 3 as LAN data.

FIG. 3 is a block diagram showing a schematic configuration of the projector 1 of FIG. 2.

In FIG. 3, the projector 1 includes: a power unit 12; a CPU 13 composed of a one-chip microcomputer; and a display control unit 14 that is connected to the CPU 13 via a system bus 137, receives a video signal from the PC 2 via the wired line 9, and performs display under the control of the CPU 13.

The CPU 13 includes: an output port 132 having two terminals; an input port 133; a ROM 134 storing a program, various data, an error message, and the like; a RAM 135 in which the program stored in the ROM 134 is loaded for execution or which is used as a work area for various purposes; and a timer 136.

The power unit 12 includes: a switching power supply 121 having a switch 122 and a control terminal 125; a wired line 123 through which standby power is automatically supplied to the CPU 13 when AC power is supplied from the outside to the projector 1; and a wired line 124 through which main power is supplied to respective units, such as the display control unit 14, of the projector 1.

The term "standby power" used herein represents power that is supplied to the CPU 13, even before the entire projector 1 is activated, in the case where the projector 1 is connected to an external AC power supply. The term "main power" represents power that is supplied to the respective units (not shown) including the display control unit 14 when the CPU 13 detects that the power switch 5 has been depressed.

The control terminal 125 allows a control signal, which is sent from one of the terminals of the output port 132 of the CPU 13 via a wired line 125a, to control the switch 122 for controlling ON/OFF of the main power.

The other terminal of the output port 132 is connected to the AP 3 via the wired line 7 to allow the sending of a power ON request signal or a power OFF request signal under the control of the CPU 13.

The input port 133 is connected to the power switch 5 to allow the polling of a depression state of the power switch 5.

Figure 4:
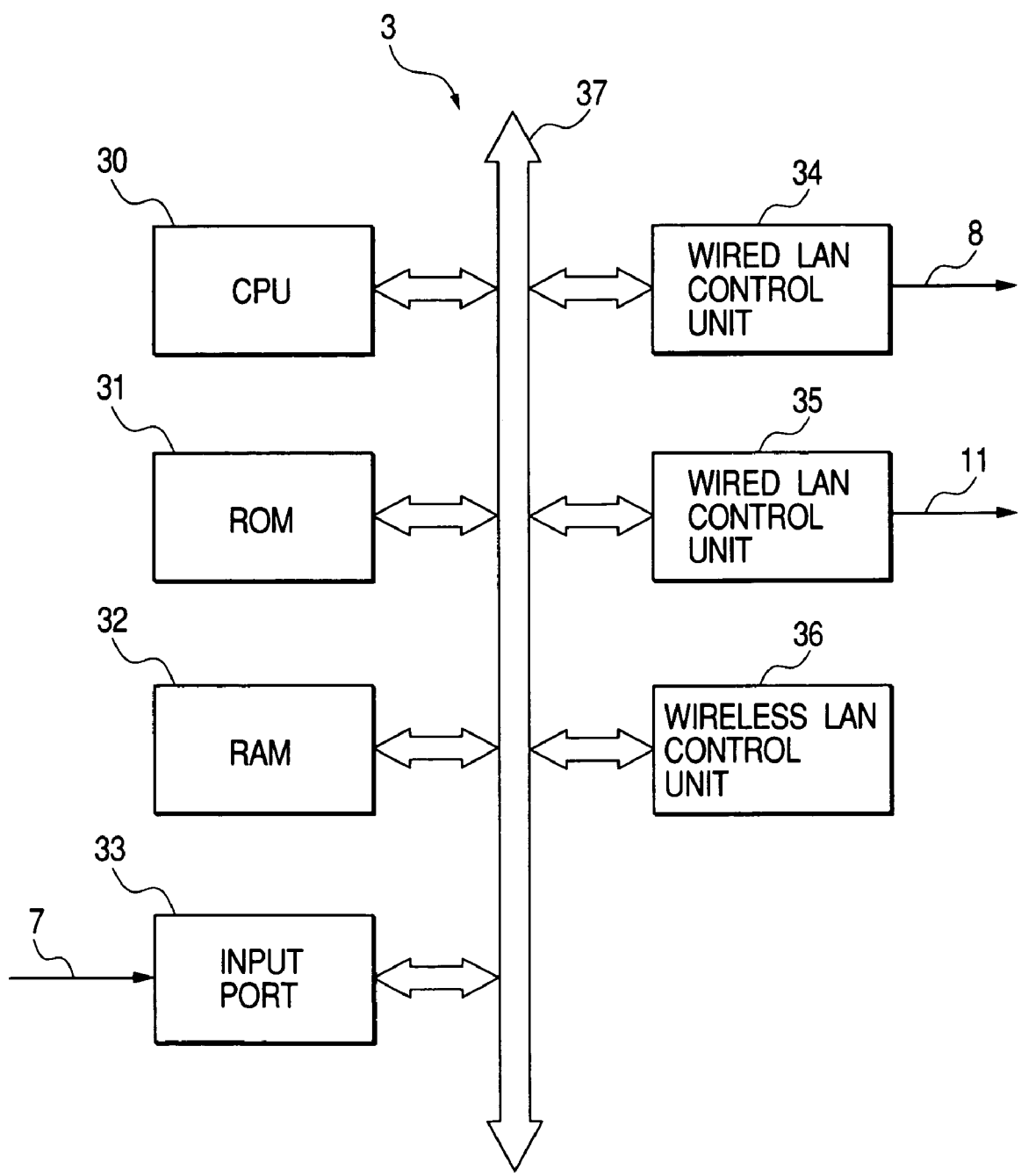
FIG. 4 is a block diagram showing a configuration of an access point according to the first embodiment of the present invention.

FIG. 4 is a block diagram showing a schematic configuration of the AP 3 of FIG. 2.

In FIG. 4, the AP 3 includes: a CPU 30 for managing the entire control of the AP 3; a ROM 31 storing a program and various data; a RAM 32 in which the program in the ROM 31 is loaded for execution or which is used as a work area for various purposes; an input port 33 for receiving an ON/OFF request signal from the projector 1 via the wired line 7; a wired LAN control unit 34 for sending/receiving a LAN signal to/from the PC 2 via the wired line 8; a wired LAN control unit 35 for sending/receiving a LAN signal to/from the server computer via the wired line 11; a wireless LAN control unit 36 for wirelessly connecting to the client device; and a system bus 37 for connecting those components to one another.

The CPU 30 can read out via the system bus 37 the ON/OFF request signal received by the input port 33 from the projector 1. The CPU 30 also controls data transfer among the PC 2 connected to the wired LAN control unit 34, the server computer on the backbone LAN 10 connected to the wired LAN control unit 35, and the client device connected to the wireless LAN control unit 36.

If power is supplied to the AP 3 from the external AC power supply (not shown), the power is supplied only to the CPU 30, the ROM 31, the RAM 32, and the input port 33, which become active. When the input port 33 receives the ON request signal from the projector 1, the power is supplied to the respective units, activating the entire AP 3.

Figure 5:
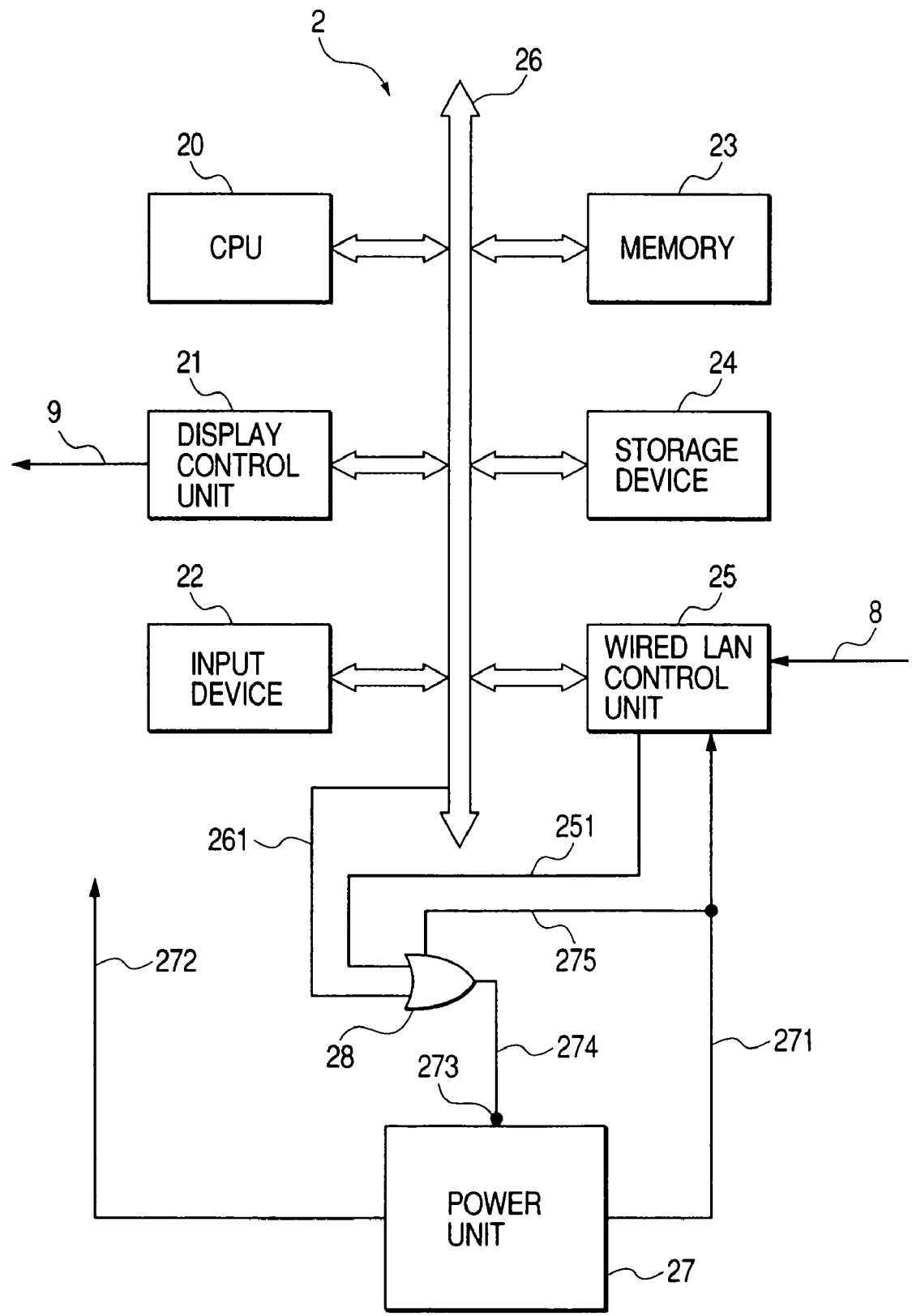
FIG. 5 is a block diagram showing a configuration of a host PC according to the first to fourth embodiments of the present invention.

FIG. 5 is a block diagram showing a schematic configuration of the PC 2 of FIG. 2.

In FIG. 5, the PC 2 includes: a CPU 20 managing the entire control of the PC 2; a memory 23 in which programs including activation software of FIG. 8 and shutdown software of FIG. 11 to be described later are loaded for execution or which is used as a work area for various purposes; a display control unit 21 that is connected to the projector 1 via the wired line 9; a storage device 24 such as a hard disk drive or a floppy (trade name) disk drive; an input device 22 such as a keyboard or a mouse; a wired LAN control unit 25; and a system bus 26 for connecting those components to one another.

The software is activated simultaneously with the activation of an operation system (hereinafter, referred to as "OS") that starts operation at the same time when the CPU 20 is supplied with power to become active. The software then stays resident.

The PC 2 further includes a power unit 27 that uses an OR gate element 28 to perform power control on respective structural components of the PC 2.

The power unit 27 includes: a wired line 271 through which standby power is supplied to the wired LAN control unit 25 and the OR gate element 28 when the power unit 27 is supplied with AC power; a wired line 272 through which main power is supplied to the respective structural components of the PC 2; and a power control terminal 273 for allowing the control ON/OFF of the main power.

The wired LAN control unit 25 sends an output signal instructing to start power control to the OR gate element 28 via a wired line 251, and is connected to the wired line 8 to send/receive a LAN signal to/from the AP 3. The wired LAN control unit 25 has a unique MAC address, which is used when a Wake on LAN function is enabled.

The OR gate element 28 has an input portion connected to the wired LAN control unit 25 via the wired line 251, and to a wired line 261 through which an output signal instructing to start/terminate power control is sent from a system control unit (not shown) to the OR gate element 28 via the system bus 26. The OR gate element 28 also has an output portion connected to the power control terminal 273 of the power unit 27 via a wired line 274. Note that at this time, power is shut off to the CPU 20, so that the CPU 20 cannot output a start signal.

The display control unit 21 is connected to the wired line 9 to send a video signal to the PC 2.

In the above configuration, when the wired LAN control unit 25 receives an activation packet including its own MAC address by a LAN signal via the wired line 8, the wired LAN control unit 25 sends to the main power supply an output signal instructing to start power control via the wired line 251 and the OR gate element 28 to start power supply from the main power supply to the respective structural components of the PC 2 via the wired line 272. When receiving a termination packet by a LAN signal via the wired line 8 and the wired LAN control unit 25, the CPU 20 sends to the main power supply an output signal instructing to terminate power control via the system control unit (not shown), the wired line 261, and the OR gate element 28 to allow the termination of the power supply from the main power supply to the respective structural components of the PC 2 via the wired line 272.

Hereinafter, description will be made of power control operation for the electronic conference system 100 of FIGS. 1 and 2 having the above-mentioned configuration.

First, description will be made of an activation process for the entire electronic conference system 100.

Figure 6:
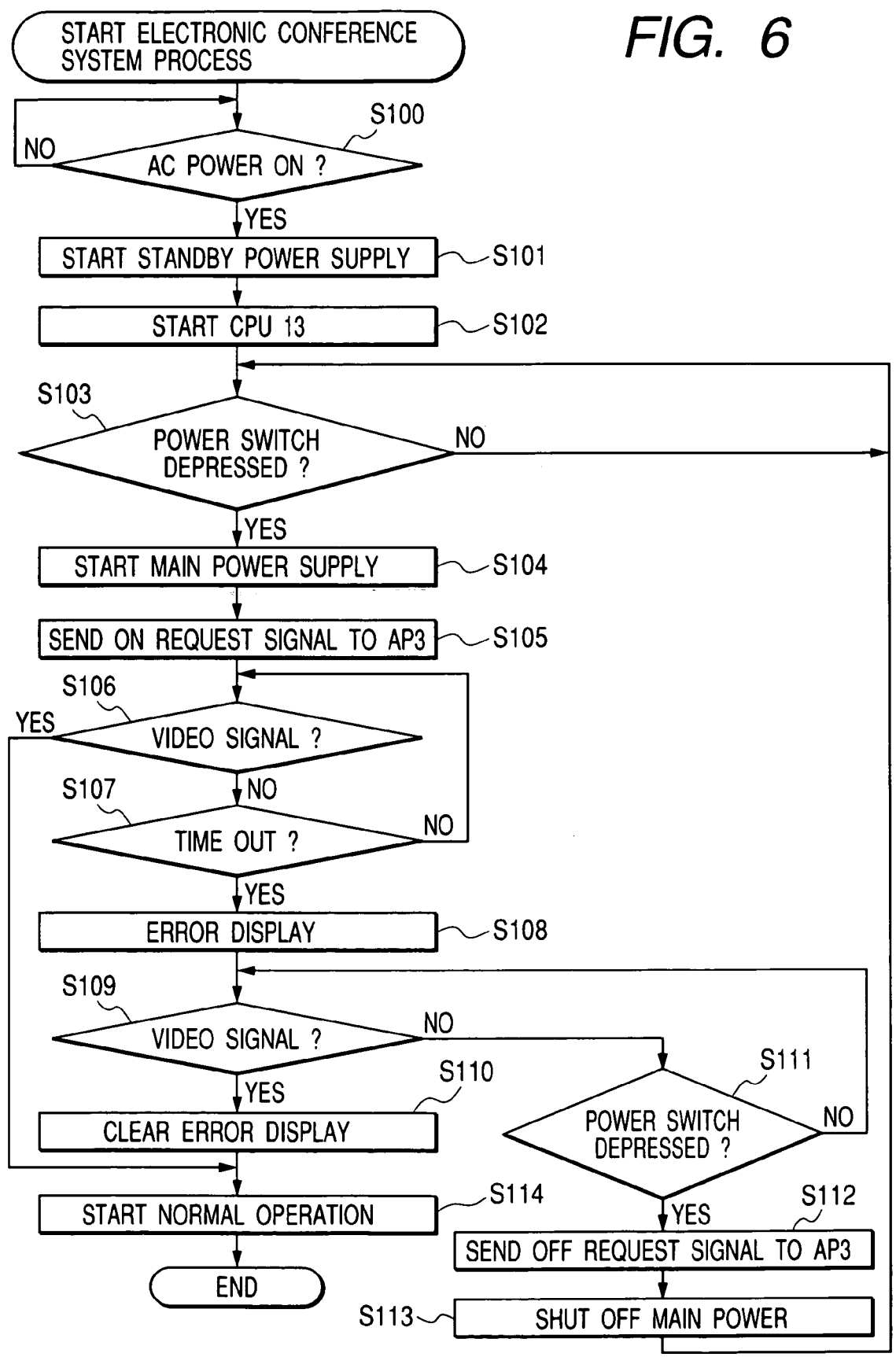
FIG. 6 is a flow chart of an activation process for the projector according to the first and third embodiments of the present invention.
Figure 7:
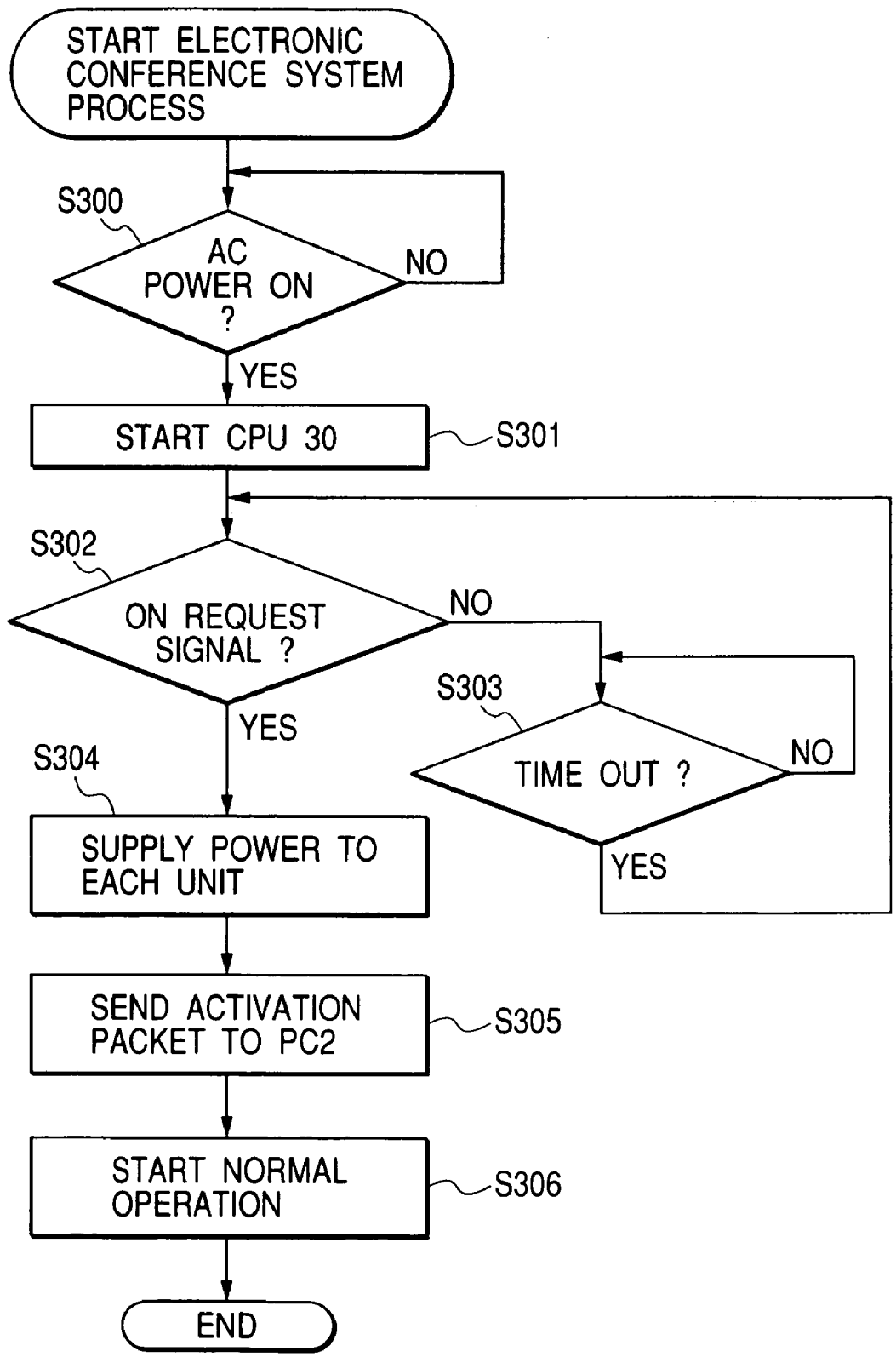
FIG. 7 is a flow chart of an activation process for the access point according to the first embodiment of the present invention.
Figure 8:
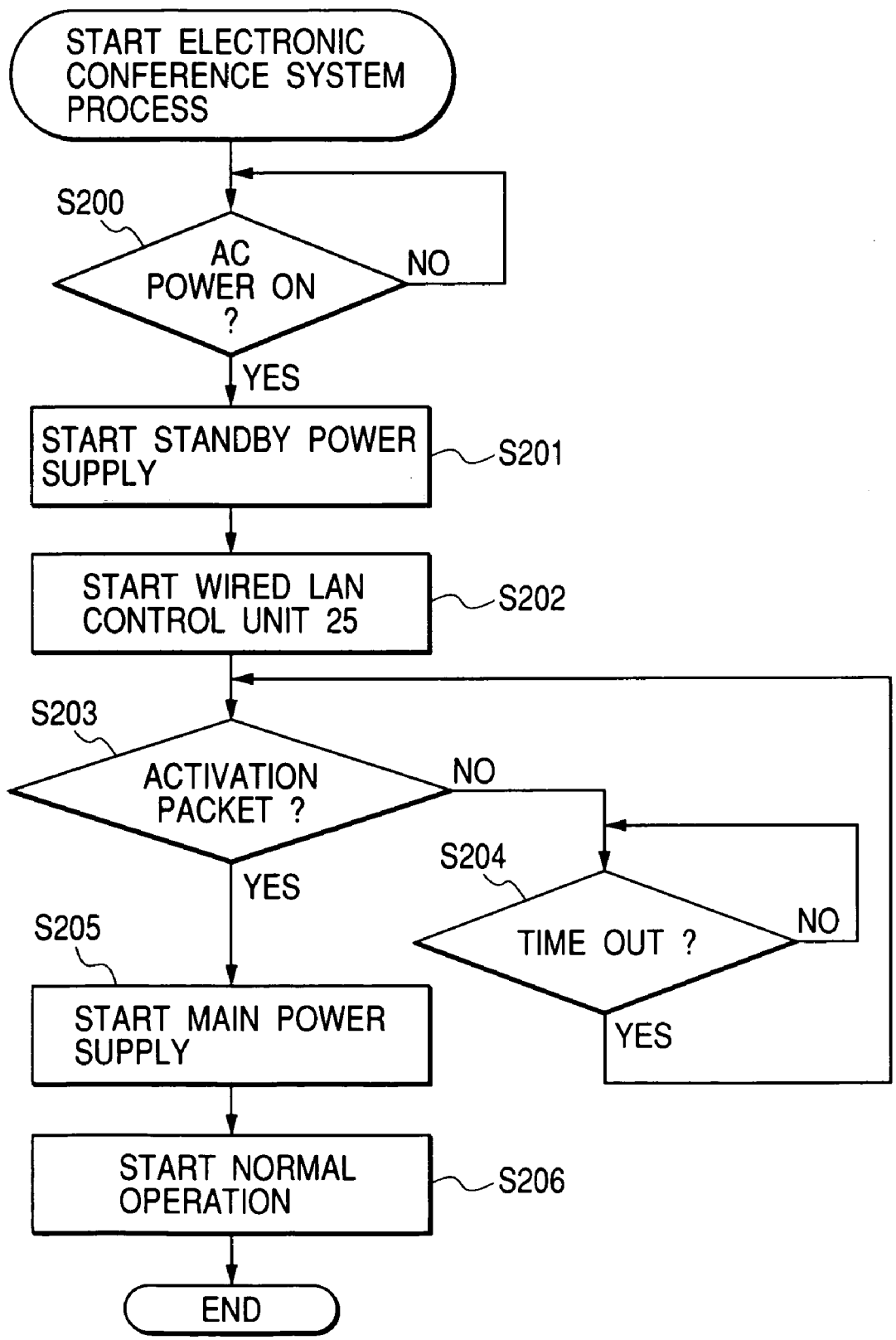
FIG. 8 is a flow chart of an activation process for the host PC according to the first to fourth embodiments of the present invention.

In this process, power is first turned ON to activate the projector 1 (FIG. 6), in response to which power is respectively turned ON to activate the AP 3 and the PC 2 in order (FIGS. 7 and 8).

FIG. 6 is a flow chart of an activation process for the electronic conference system 100 in the projector 1 of FIG. 3.

Immediately after AC power is supplied to the projector 1, the switch 122 is in an OFF state.

In FIG. 6, when the AC power is supplied to the projector 1 (YES in step S100), standby power is supplied to the CPU 13 via the wired line 123 (step S101) to make the CPU 13 active (start the CPU 13) (step S102).

The started CPU 13 reads out the state of the power switch 5 via the input port 133, and upon the judgment that the power switch 5 has been depressed with reference to the state (YES in step S103), sends a control signal for turning ON the switch 122 of the power unit 12 from one of the terminals of the output port 132 to the control terminal 125 via the wired line 125a. The started CPU 13 then starts to supply main power to the respective units of the projector 1 via the wired line 124 to activate the entire projector 1 (step S104).

Subsequently, the CPU 13 sends an ON request signal to the AP 3 from one of the terminals of the output port 132 via the wired line 7 (step S105), and discriminates whether or not the display control unit 14 has received via the wired line 9 a video signal sent from the PC 2 (step S106).

As a result of the discrimination of step S106, since the video signal is not received yet at first (NO in step S106), the process returns to the discrimination of step S106 within a time-out period (for example, 2 minutes) (NO in step S107).

When the video signal is received (YES in step S106) within the time-out period (NO in step S107), the CPU 13 judges that the AP 3 and the PC 2 have started operation successfully, normal operation is then started (step S114), and the process ends. The term "normal operation" used herein represents operation in which the display control unit 14 outputs and displays the video signal from the PC 2 in the display area 4.

When the time-out period elapses (YES in step S107) without having received the video signal (NO in step S106), the CPU 13 judges that the AP 3 and the PC 2 does not normally operate for some reason. The display control unit 14 then displays in the display area 4 an error message that reads as, for example, "Receiving no video signal. Please check on your personal computer or access point." (step S108). Therefore, a user can be notified that the AP 3 or the PC 2 has not been activated successfully.

Subsequently, discrimination as to whether or not the video signal has been received via the wired line 9 (step S109) is performed again repeatedly until the power switch 5 is depressed (YES in step S111). In the case where the user has eliminated the cause of the error after reading the error message displayed in the display area 4 in step S108, the video signal is received by the next discrimination of step S109. In this case, the error display is cleared (step S110), and the normal operation is then started (step S114), and the process ends.

When the power switch 5 is depressed (YES in step S111) without having received the video signal (NO in step S109), the CPU 13 sends an OFF request signal from one of the terminals of the output port 132 to the AP 3 via the wired line 7 (step S112), and shuts off the main power via the wired line 124 (step S113). Then, the process returns to step S103. Since the main power was shut off in step S113, only the CPU 13 operates until the power switch 5 is later judged to be depressed in step S103. This equals a state where the projector 1 is not entirely activated.

FIG. 7 is a flow chart of an activation process for the electronic conference system 100 from the viewpoint of the AP 3 of FIG. 4.

In FIG. 7, when AC power is supplied to the AP 3 (YES in step S300), the power is supplied only to the CPU 30, the ROM 31, the RAM 32, and the input port 33, which become active (step S301). In other words, immediately after the AC power is supplied, the AP 3 is in a power OFF state, and the CPU 30 operates in a low power consumption mode.

Subsequently, the CPU 30 discriminates whether or not the input port 33 has received via the wired line 7 an ON request signal sent from the projector 1 in step S105 of FIG. 6 (step S302).

As a result of the discrimination of step S302, after the elapse of a time-out period (for example, 100 ms) (YES in step S303), the process repeats step S302 until the ON request signal is received (YES in step S302). In other words, the discrimination of step S302 is performed every 100 ms.

After that, when the ON request signal is received (YES in step S302), the power is supplied to the respective units of the AP 3 including the wired LAN control units 34 and 35 and the wireless LAN control unit 36, which are initialized and then made active. That is, the entire AP 3 is activated (step S304) and the process advances to step S305. Before the power is supplied to the respective units of the AP 3 (step S304), the CPU 30 merely performs the discrimination every 100 ms as to whether or not the input port 33 has received the ON request signal via the wired line 7 (steps S302 and S303), thereby realizing sufficient operation in the low power consumption mode.

In step S305, the CPU 30 causes the wired LAN control unit 34 to send an activation packet compatible with Wake on LAN to the PC 2 by a LAN signal via the wired line 8. The normal operation is then started (step S306), and the process ends. The term "normal operation" used herein represents operation in which the AP 3 is wirelessly connected to the client device and connected to the PC 2 and the backbone LAN 10 by wires, while managing data transfer between one another.

FIG. 8 is a flow chart of an activation process for the electronic conference system 100 from the viewpoint of the PC 2 of FIG. 5.

In FIG. 8, when AC power is supplied to the PC 2 (YES in step S200), standby power starts to be supplied to the wired LAN control unit 25 and the OR gate element 28 via the wired line 271 (step S201) to make active (to start) the wired LAN control unit 25 and the OR gate element 28 (step S202).

Subsequently, it is discriminated whether or not the started wired LAN control unit 25 has received the activation packet compatible with Wake on LAN sent from the AP 3 in step S305 of FIG. 7 (step S203).

If the activation packet is received (YES in step S203), the output signal instructing to start power control via the wired line 251 and the OR gate element 28 is sent to the power unit 27, and main power supply is started via the wired line 272 to activate the PC 2 (step S205). The normal operation is then started (step S206), and the process ends. The term "normal operation" used herein represents operation in which in response to the operation of the wireless client device via the AP 3, a file is sent to/received from the server computer (not shown) connected to the backbone LAN 10 via the AP 3 as well, or a file of the PC 2 itself is converted into a video signal to be sent to the projector 1.

According to the activation process for the electronic conference system 100 of FIGS. 6 to 8, when the power switch 5 of the projector 1 is depressed (YES in step S103) in the state where the entire projector 1 has not been activated, the projector 1 activates its entirety (step S104) and sends an ON request signal to the AP 3 (step S105). The AP 3 that has received the ON request signal activates its entirety (step S304) and sends an activation packet to the PC 2 (step S305). The PC 2 that has received the activation signal activates its entirety (step S205). Accordingly, only one step of operation makes it possible to gang the activation of the respective power supplies of the projector 1, the AP 3, and the PC 2.

Next, description will be made of a shutdown process for the entire electronic conference system 100.

Figure 9:
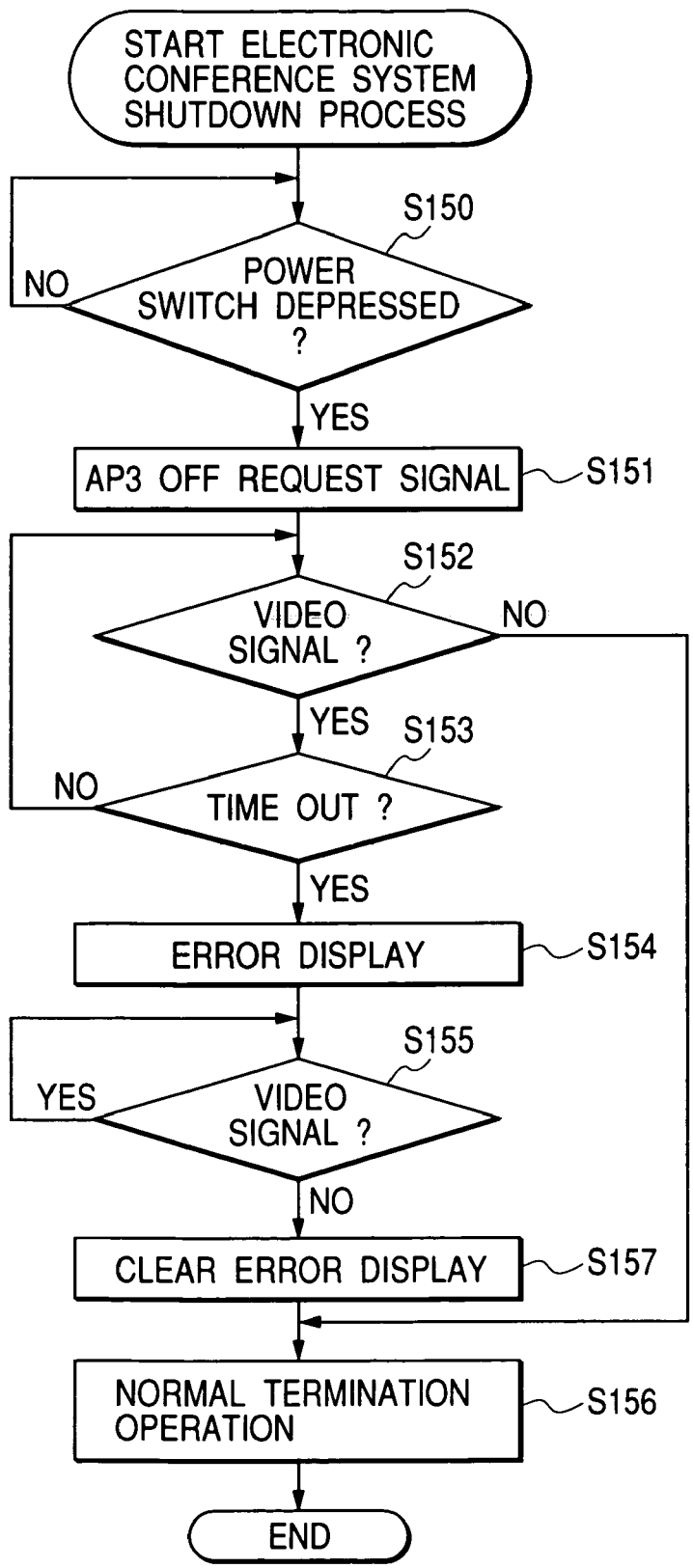
FIG. 9 is a flow chart of a shutdown process for the projector according to the first embodiment of the present invention.
Figure 10:
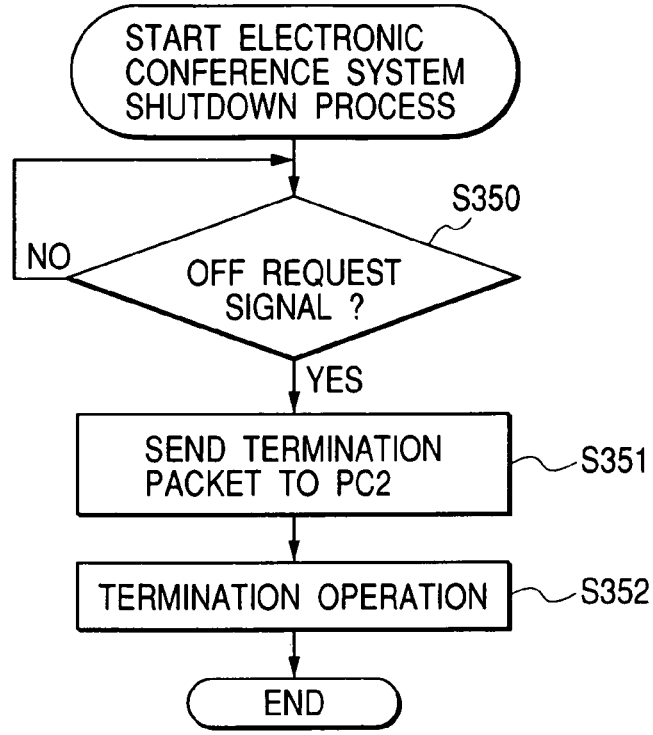
FIG. 10 is a flow chart of a shutdown process for the access point according to the first embodiment of the present invention.
Figure 11:
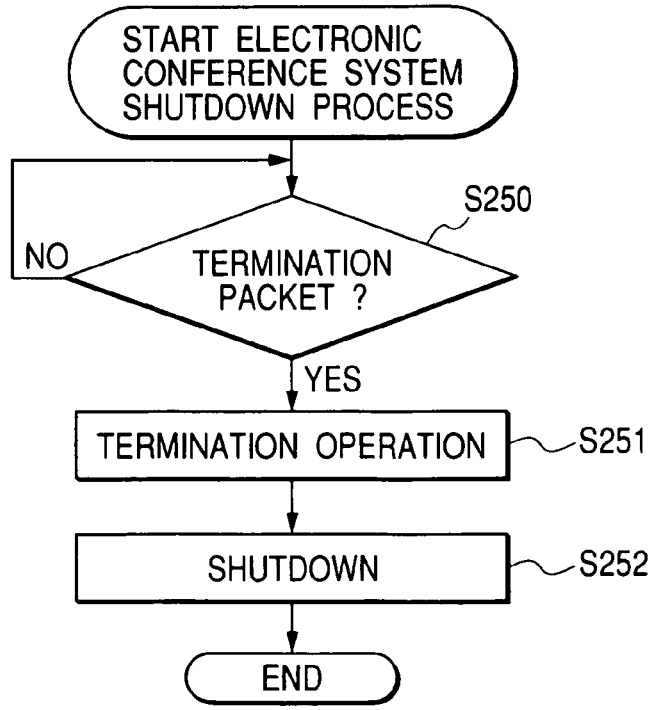
FIG. 11 is a flow chart of a shutdown process for the host PC according to the first and fourth embodiments of the present invention.

In this process, the power switch 5 is depressed again to shut OFF the power supply of the projector 1 (FIG. 9), in response to which the power supplies of the AP 3 and the PC 2 are shut off in order (FIGS. 10 and 11).

FIG. 9 is a flow chart of a shutdown process for the electronic conference system 100 in the projector 1 of FIG. 3.

Note that this process takes place after the normal operation is performed in the activation process for the electronic conference system 100 from the viewpoint of the projector 1 of FIG. 6.

In FIG. 9, the CPU 13 first reads out the state of the power switch 5 via the input port 133, and upon the judgment that the power switch 5 has been depressed with reference to the state (YES in step S150), sends an OFF request signal from one of the terminals of the output port 132 to the AP 3 via the wired line 7 (step S151). Then, it is discriminated whether or not the video signal outputted from the PC 2 has stopped being received by the display control unit 14 (step S152).

As a result of the discrimination of step S152, since the video signal is still being received at first (YES in step S152), the process returns to the discrimination of step S152 within a time-out period (for example, 2 minutes) (NO in step S153). When the video signal stops being received (NO in step S152) within the time-out period (NO in step S153), the CPU 13 judges that the AP 3 and the PC 2 have terminated operation successfully. Normal termination operation of the projector 1 is then performed (step S156), and the process ends. The term "normal termination operation" used herein represents operation for shutting off the main power via the wired line 124 and returning the process to step S103.

When the time-out period elapses (YES in step S153) with the video signal continuing to be received (YES in step S152), the CPU 13 judges that the AP 3 and the PC 2 has not been shut down normally for some reason. The display control unit 14 then displays in the display area 4 an error message that reads as, for example, "Your personal computer has not been shut down. Please check on your computer or access point" (step S154). Therefore, a user can be notified that the AP 3 or the PC 2 has not been shut down successfully.

After that, the discrimination as to whether or not the video signal has stopped being received is repeated until the video signal stops being received (NO in step S155). In the case where the user has eliminated the cause of the error after reading the error message displayed in the display area 4 in step S154, the video signal stops being received by the next discrimination of step S155.

In this case, the error display is cleared (step S157), the normal operation of the shutting down the projector 1 is performed (step S156), and the process ends.

FIG. 10 is a flow chart of a shutdown process for the electronic conference system 100 in the AP 3 of FIG. 4.

Note that this process takes place after the normal operation is performed in the activation process for the electronic conference system 100 from the viewpoint of the AP 3 of FIG. 7.

In FIG. 10, when the input port 33 receives the OFF request signal, which is sent from the projector 1 to the AP 3 in step S112 of FIG. 6 or step S151 of FIG. 9, via the wired line 7 (YES in step S350) during the normal operation of FIG. 7 (step S306), the CPU 30 sends a termination packet predetermined for the PC 2 by the wired LAN control unit 34 (step S351). Normal termination operation of the AP 3 is then performed (step S352), and the process ends. The term "normal termination operation" used herein represents operation in which the power supply to the respective units of the AP 3 including the wired LAN control units 34 and 35 and the wireless LAN control unit 36 is shut off to inactivate the respective units, and the process returns to step S302 of FIG. 7.

FIG. 11 is a flow chart of a shutdown process for the electronic conference system 100 in the PC 2 of FIG. 5.

Note that this process takes place after the normal operation is performed in the activation process for the electronic conference system 100 from the viewpoint of the PC 2 of FIG. 8.

In FIG. 11, when receiving the termination packet sent from the AP 3 to the PC 2 in step S351 of FIG. 10 (YES in step S250) during the normal operation of FIG. 8 (step S206), the CPU 20 allows the shutdown software already staying resident in the PC 2 to perform normal termination operation (step S251). The term "normal termination operation" used herein represents operation for terminating running operation such as the sending of the video signal to the projector 1, terminating the OS itself, sending the output signal instructing to terminate the power control to the power unit 27 via the wired line 261 and the OR gate element 28, shutting off the main power supply to the respective structural components of the PC 2 via the wired line 272, and returning the process to step S203 of FIG. 8.

According to the shutdown process for the electronic conference system 100 of FIGS. 9 to 11, when the power switch 5 is depressed (YES in step S150) during the normal operation, the projector 1 sends the OFF request signal to the AP 3 (step S151). The AP 3 that has received the OFF request signal sends the termination packet to the PC 2 (step S351), entering the low power consumption mode (step S352). After the PC 2 that has received the termination packet ends the sending of the video signal to the projector 1, only the wired LAN control unit 25 and the OR gate element 28 are made active by the standby power (step S251). When the video signal stops being received from the PC 2 (NO in step S152 or NO in step S155), the main power is shut off to the projector 1 (step S156). Accordingly, only one step of operation makes it possible to gang the termination of the respective power supplies of the projector 1, the AP 3, and the PC 2.

As described above, the configuration is adopted, in which the power switch 5 is provided to the projector 1, the ON/OFF request signal is sent from the projector 1 to the AP 3, and the activation/termination packet is sent from the AP 3 to the PC 2 on the LAN. Therefore, the electronic conference system 100 can be realized, in which the power switch 5 makes it possible to gang the power supplies of the projector 1, the AP 3, and the PC 2. Accordingly, even in the case where the PC 2 and the AP 3 are disposed inside the casing of the projector 1, the electronic conference system 100 with the ganged power control makes it unnecessary to access the inside of the projector 1. As a result, the entire system can be reduced in size while maintaining operability.

Further, it is checked at the time of activation that the video signal has been received from the PC 2 to the projector 1, and it is checked at the time of termination that the video signal has stopped being sent from the PC 2 to the projector 1, so that normally ganged power control can be confirmed. In contrast, it is possible that an abnormal state is detected, and an error message is displayed on the projector 1 at the time of abnormality, thereby realizing the electronic conference system 100 that can notify a user of the occurrence of an error.

Further, as a component for sending the activation/termination packet to the PC 2 on the LAN, the AP 3 essential to the system configuration is used without using other PCs. Accordingly, the electronic conference system 100 can be prevented from bloating.

In this embodiment, the ON/OFF request signal is sent from the projector 1 to the AP 3 via the wired line 7. However, instead of the wired line 7, a wireless circuit such as Bluetooth and 802.11 can be used for the sending.

Second Embodiment

Hereinafter, the electronic conference system 100 according to a second embodiment of the present invention will be described in detail with reference to the drawings.

The configuration of this embodiment is basically the same as the electronic conference system 100 of FIGS. 1 and 2, and merely different in the use of Bluetooth (hereinafter, referred to as "BT").

In the following description, the same elements are denoted by the same symbols to avoid duplication of description. P FIG. 12 is a block diagram showing a schematic configuration of the projector 1 in the electronic conference system 100 in this embodiment.

Figure 12:
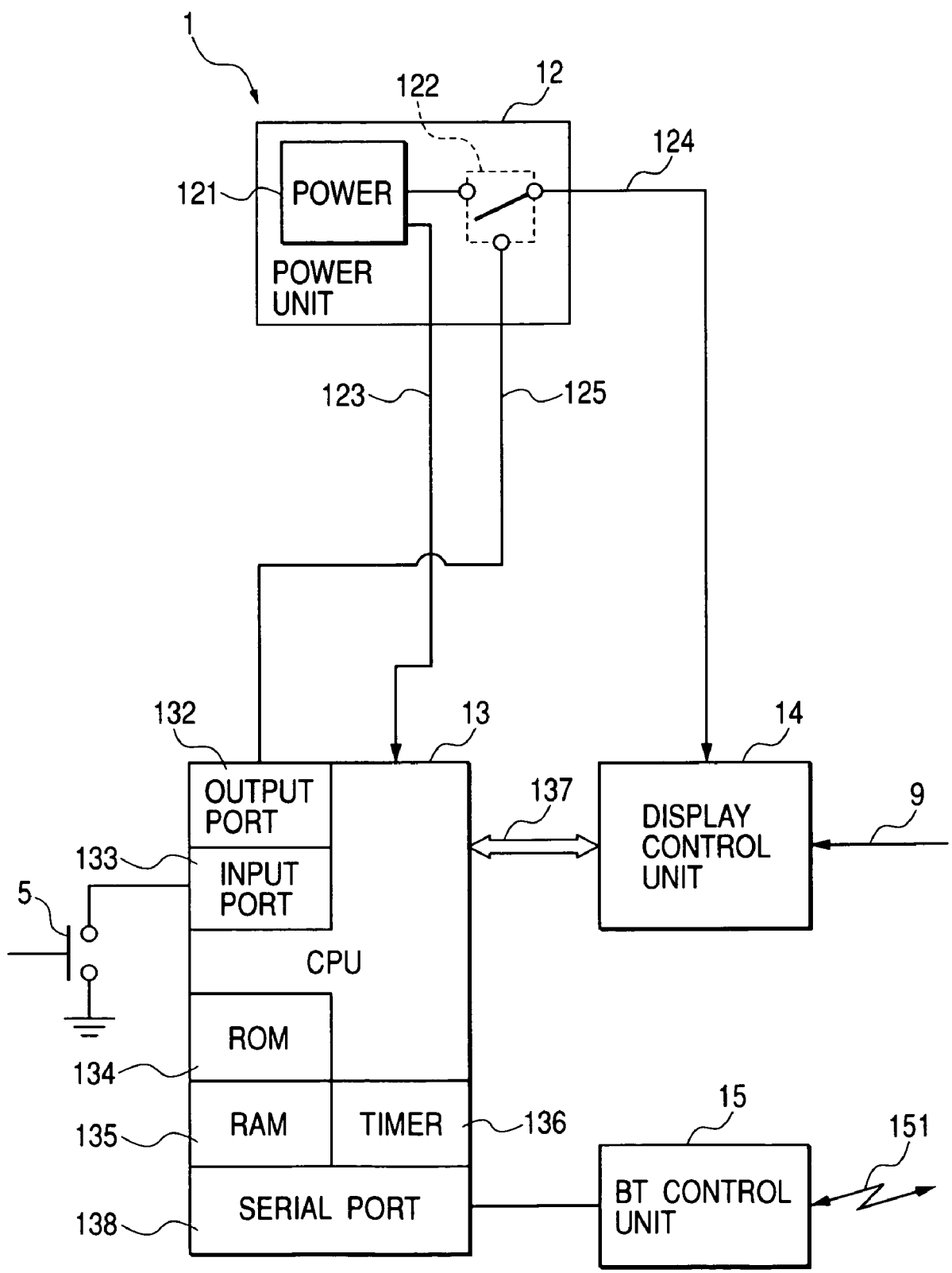
FIG. 12 is a block diagram showing a schematic configuration of a projector according to the second embodiment of the present invention.

In FIG. 12, the CPU 13 further includes a serial port 138 for communicating with a BT control unit 38 of the AP 3 via a wireless circuit 151 and a BT control unit 15.

Figure 13:
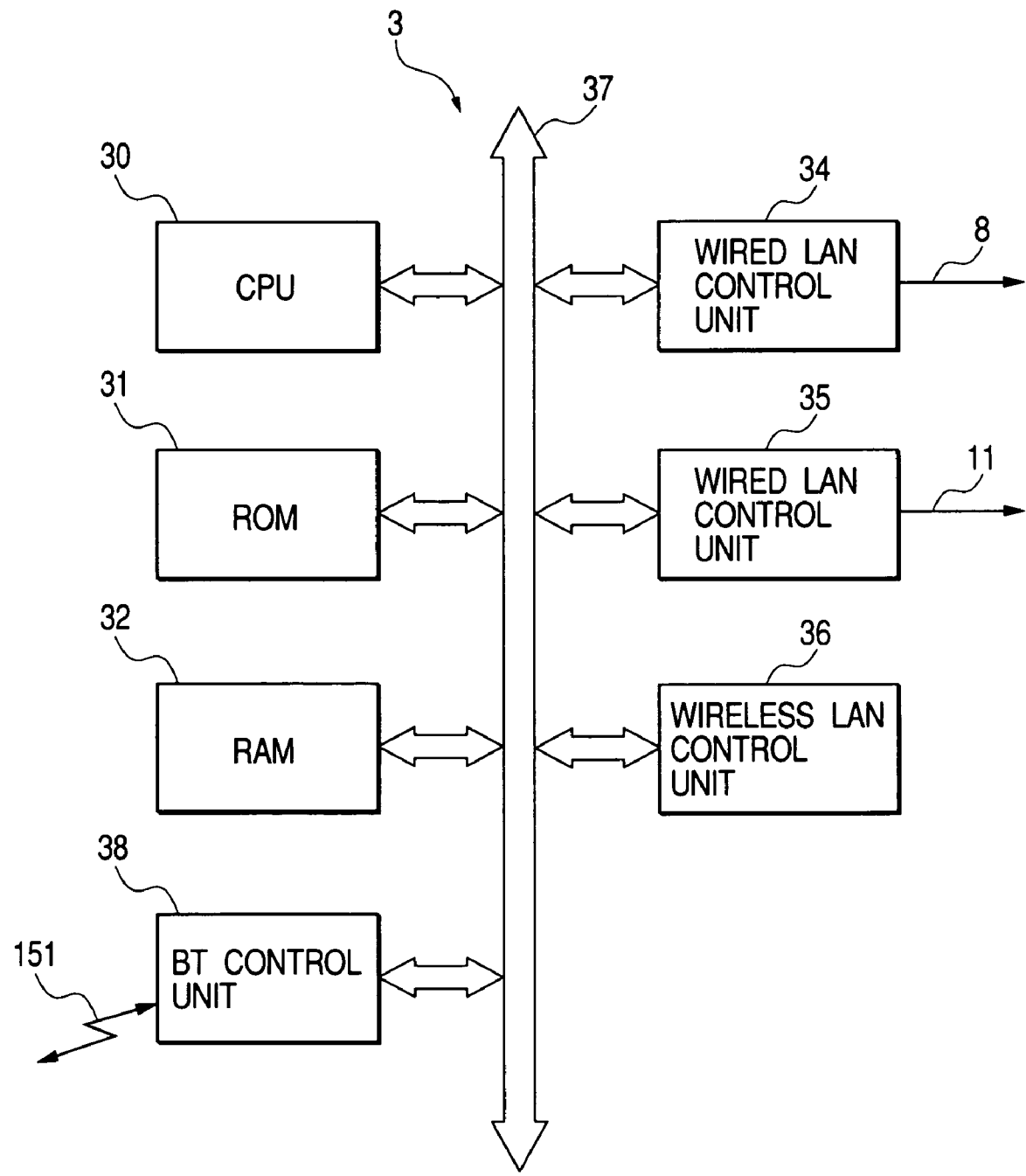
FIG. 13 is a block diagram showing a schematic configuration of an access point according to the second embodiment of the present invention.

FIG. 13 is a block diagram showing a schematic configuration of the AP 3 in the electronic conference system 100 in this embodiment.

In FIG. 13, the AP 3 further includes the BT control unit 38 connected to the CPU 30 via the system bus 37.

Hereinafter, description will be made of the operation process for the electronic conference system 100 of FIG. 12 having the above-mentioned configuration.

First, description will be made of an activation process for the entire electronic conference system 100 of FIG. 12.

Figure 14:
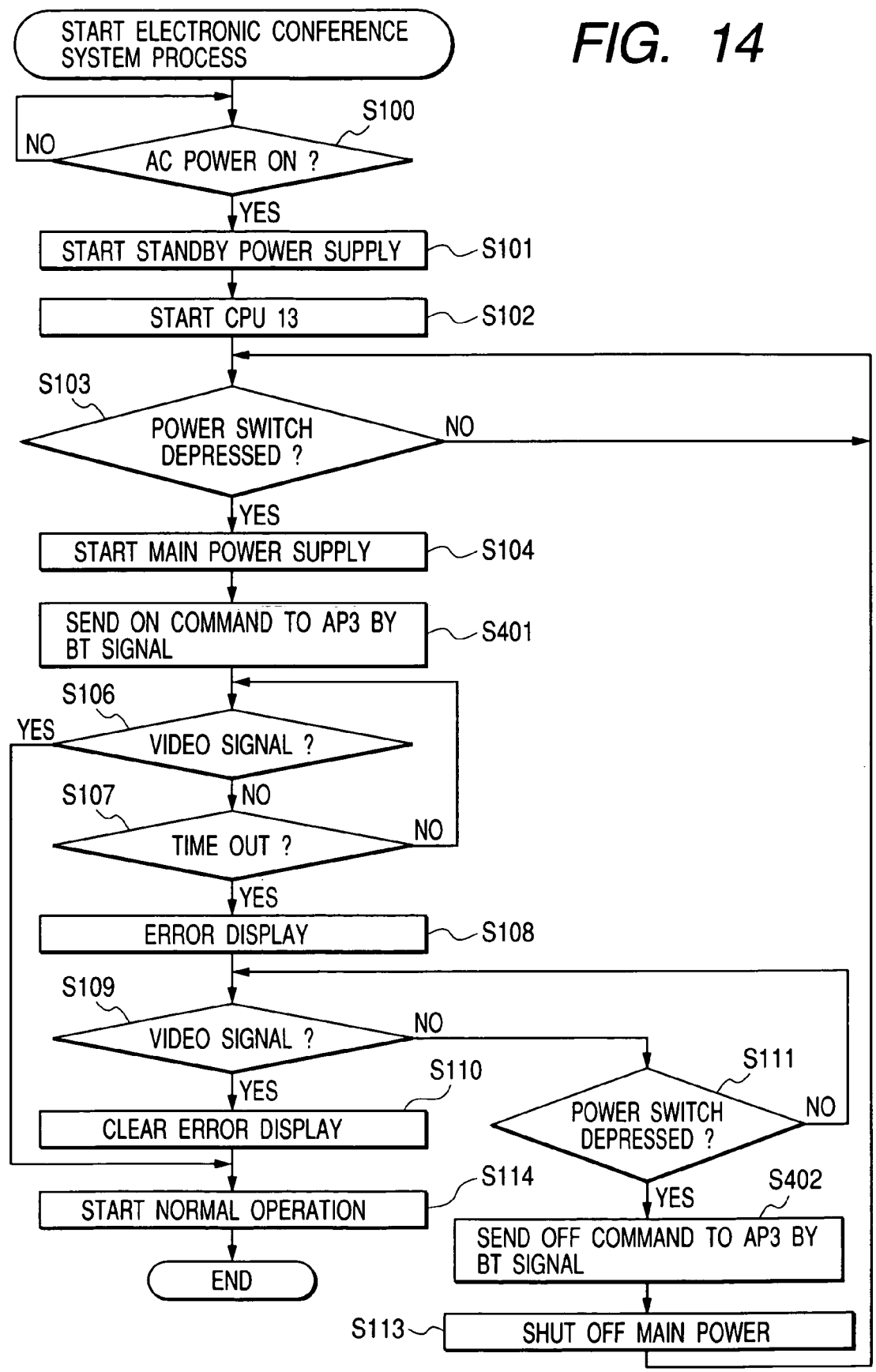
FIG. 14 is a flow chart of an activation process for the projector according to the second embodiment of the present invention.
Figure 15:
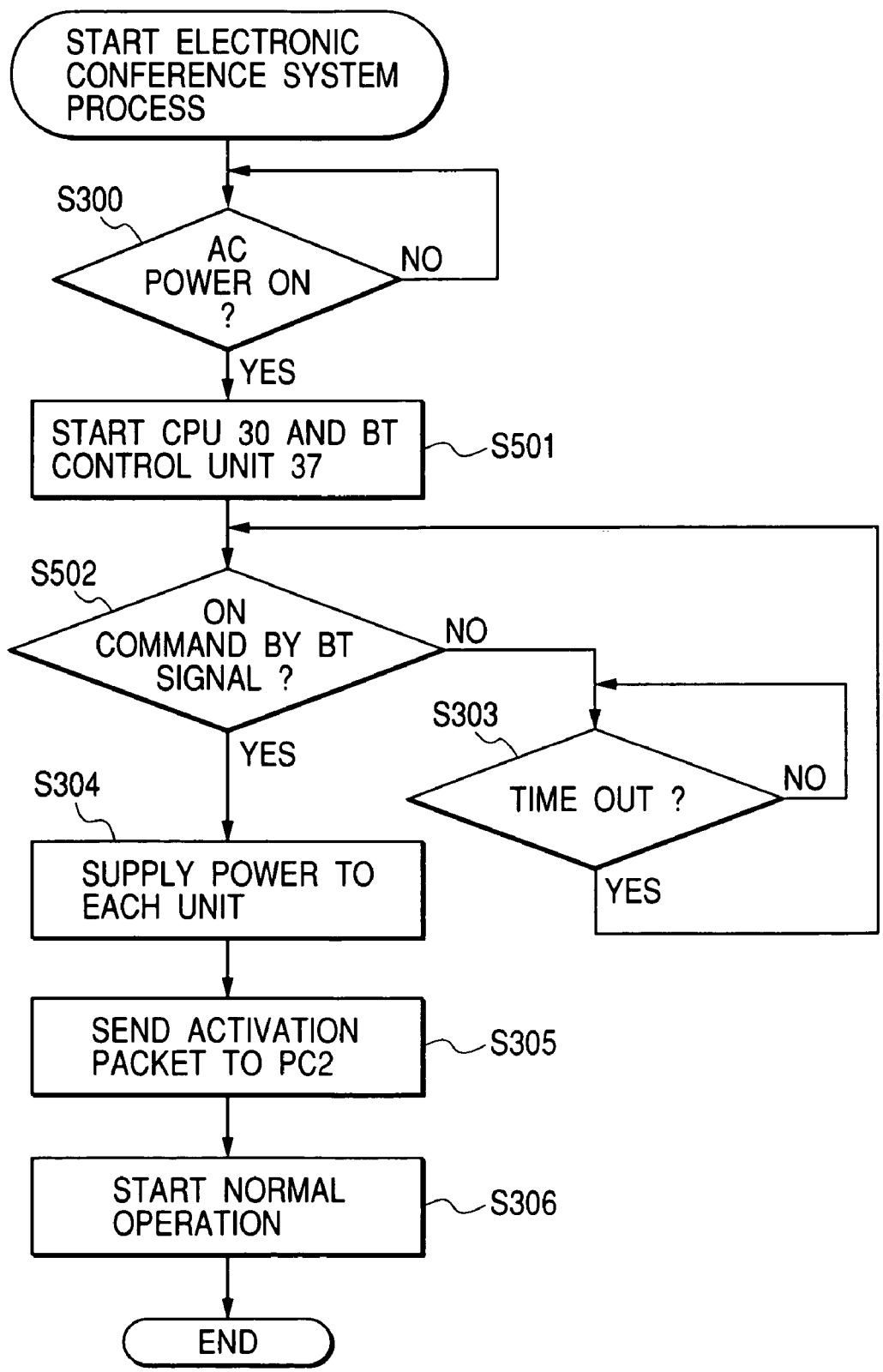
FIG. 15 is a flow chart of an activation process for the access point according to the second embodiment of the present invention.

In this process, similarly to the processes of FIGS. 6 to 8, power is first turned ON to activate the projector 1 (FIG. 14), in response to which power is respectively turned ON to activate the AP 3 and the PC 2 in order (FIG. 15). The following steps are basically the same as those of the electronic conference system 100 according to the first embodiment of the present invention. In the following description, the same steps are denoted by the same symbols to avoid duplication of description.

FIG. 14 is a flow chart of an activation process for the electronic conference system 100 in the projector 1 of FIG. 12.

In FIG. 14, first of all, after steps S101 to S104 are performed, the main power is also supplied via the wired line 124 to the BT control unit 15 being one of the structural components of the projector 1, starting the BT control unit 15.

Subsequently, the CPU 13 sends a BT signal for an ON command predetermined by the BT control unit 15, instead of the ON request signal from the output port 132, to the AP 3 via the wireless circuit 151 (step S401), and steps S106 to S111 are repeated until the reception of the video signal ends the activation process.

After sending the ON command, when the time-out period elapses (YES in step S107) without having received the video signal (NO in step S106), the CPU 13 displays an error message (step S108). When the power switch 5 is depressed (YES in step S111) without having received the video signal (NO in step S109) even after the display of the error message, the CPU 13 sends a BT signal for an OFF command predetermined by the BT control unit 15 to the AP 3 via the wireless circuit 151 (step S402), and shuts off the main power via the wired line 124 (step S113). Then, the process returns to step S103. Since the main power was shut off in step S113, only the CPU 13 operates until the power switch 5 is later judged to be depressed in step S103. This equals a state where the projector 1 is not entirely activated. Accordingly, the BT control unit 15 also stops its operation.

FIG. 15 is a flow chart of an activation process for the electronic conference system 100 from the viewpoint of the AP 3 of FIG. 13.

In FIG. 15, when AC power is supplied to the AP 3 (YES in step S300), not only the ROM 31, the RAM 32, and the input port 33 but also the BT control unit 38 becomes active (step S501).

Subsequently, the CPU 30 discriminates whether or not the BT control unit 38 has received via the wireless circuit 151 the BT signal for the ON command sent from the BT control unit 15 of the projector 1 (step S502). When the ON command has been received, steps S304 to S306 of FIG. 15 are performed, and the process ends.

Note that, the activation process for the electronic conference system 100 from the viewpoint of the PC 2 is the same as the process of FIG. 8, and thus its description is omitted.

Next, description will be made of a shutdown process for the entire electronic conference system 100 of this embodiment.

In this process, the power switch 5 is depressed again to turn OFF the power supply of the projector 1 (FIG. 16), in response to which the power switch 5 is depressed again to turn OFF the AP 3 and the PC 2 in order (FIG. 17).

FIG. 16 is a flow chart of a shutdown process for the electronic conference system 100 in the projector 1 of FIG. 12.

In FIG. 16, when step S150 is performed similarly to FIG. 9, the BT signal for the OFF command predetermined by the BT control unit 15 is sent to the AP 3 via the wireless circuit 151 (step S601), and steps S152 to S157 are repeated until the video signal stops being received to end the shutdown process.

FIG. 17 is a flow chart of a shutdown process for the electronic conference system 100 from the viewpoint of the AP 3 of FIG. 13.

In FIG. 17, the CPU 30 discriminates whether or not the BT control unit 38 has received the OFF command by the BT signal, which is sent from the projector 1 in step S601 of FIG. 16, via the wireless circuit 151 (step S701) during the normal operation in step S306 of FIG. 15. When the OFF command has been received, steps S351 and S352 of FIG. 17 are performed, and the process ends.

Note that in this embodiment, the shutdown process for the electronic conference system 100 from the viewpoint of the PC 2 of FIG. 5 is the same as the process of FIG. 11, and thus its description is omitted.

In the shutdown process for the electronic conference system 100 according to this embodiment, the ON/OFF command by the BT signal is sent from the projector 1 to the AP 3 via the wireless circuit 151 instead of the ON/OFF request signal via the wired line 7. Accordingly, the projector 1 can be increased in flexibility of layout inside its casing.

Third Embodiment

Hereinafter, a third embodiment will be described with reference to the drawings.

Figure 18:
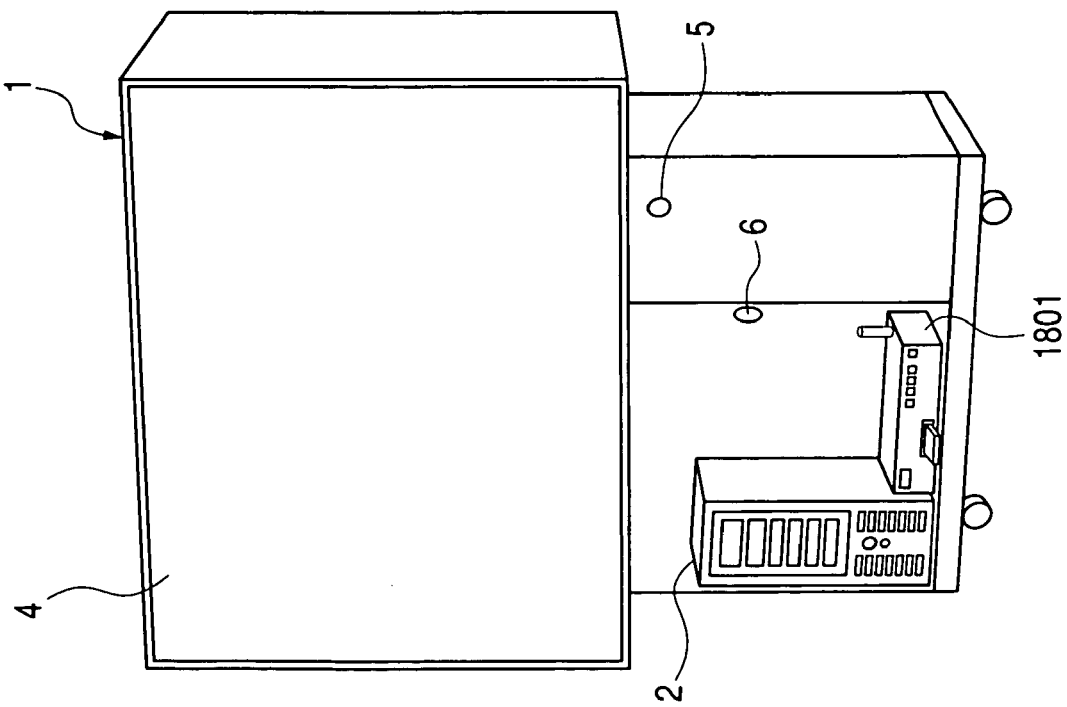
FIG. 18 is a schematic diagram of a display system according to the third embodiment of the present invention.

FIG. 18 is a perspective view showing a schematic configuration of a conference system equipped with an access point device and a display system according to the third embodiment of the present invention.

In FIG. 18, reference numeral 1801 denotes an access point device (hereinafter, referred to as "AP"); 1 a projector serving as the display device; and 2 a computer (hereinafter, referred to as "PC") serving as an information processor, which sends out a video signal to the projector 1. The PC 2 and the AP 1801 are disposed inside the casing of the projector 1. Reference numeral 4 denotes a display area for the projector 1; 5 a power switch for the projector 1; and 6 a doorknob. By handling the doorknob 6, the lower door of the casing of the projector 1 can be opened and closed for the access of the inside of the casing. Note that the components except the access point 1801 are the same as those of FIG. 1, and are thus denoted by the same reference numerals as FIG. 1.

Figure 19:
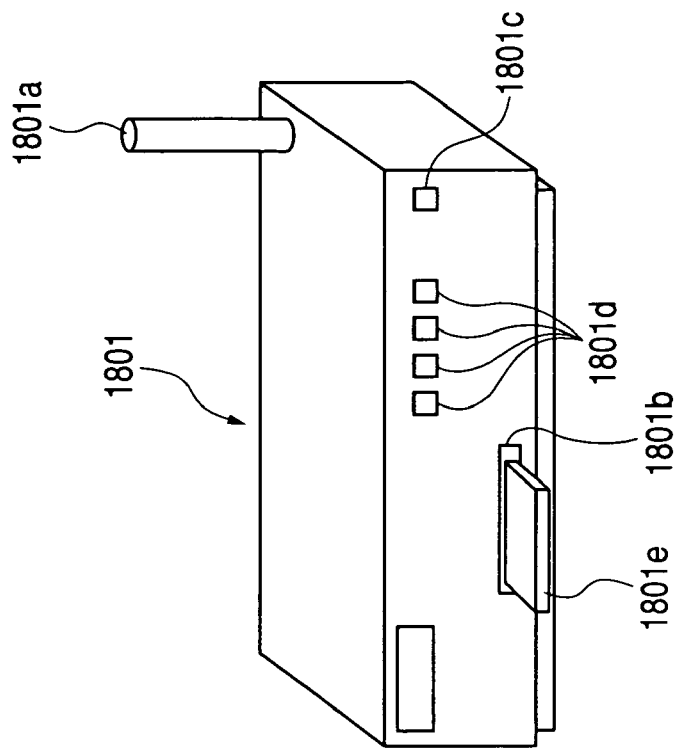
FIG. 19 is a diagram showing a configuration of an access point device according to the third embodiment of the present invention.

FIG. 19 is a perspective view showing a schematic configuration of the AP 1801.

In FIG. 19, reference numeral 1801 denotes the AP and symbol 1801a denotes an antenna used when a wireless LAN control unit (described later) sends/receives wireless data. A connector 1801b for a memory card 1801e is mounted such that the memory card 1801e can be inserted into/removed from the connector 1801b. LAN connectors 1801c and 1801d are used for a WAN and a LAN, respectively. Practically, the LAN connector 1801*c* for the WAN is connected to a backbone LAN (described later), and one of four LAN connectors 1801*d* for the LAN is connected to the PC 2. Address information (described later) is described in the memory card 1801*e*.

Figure 20:
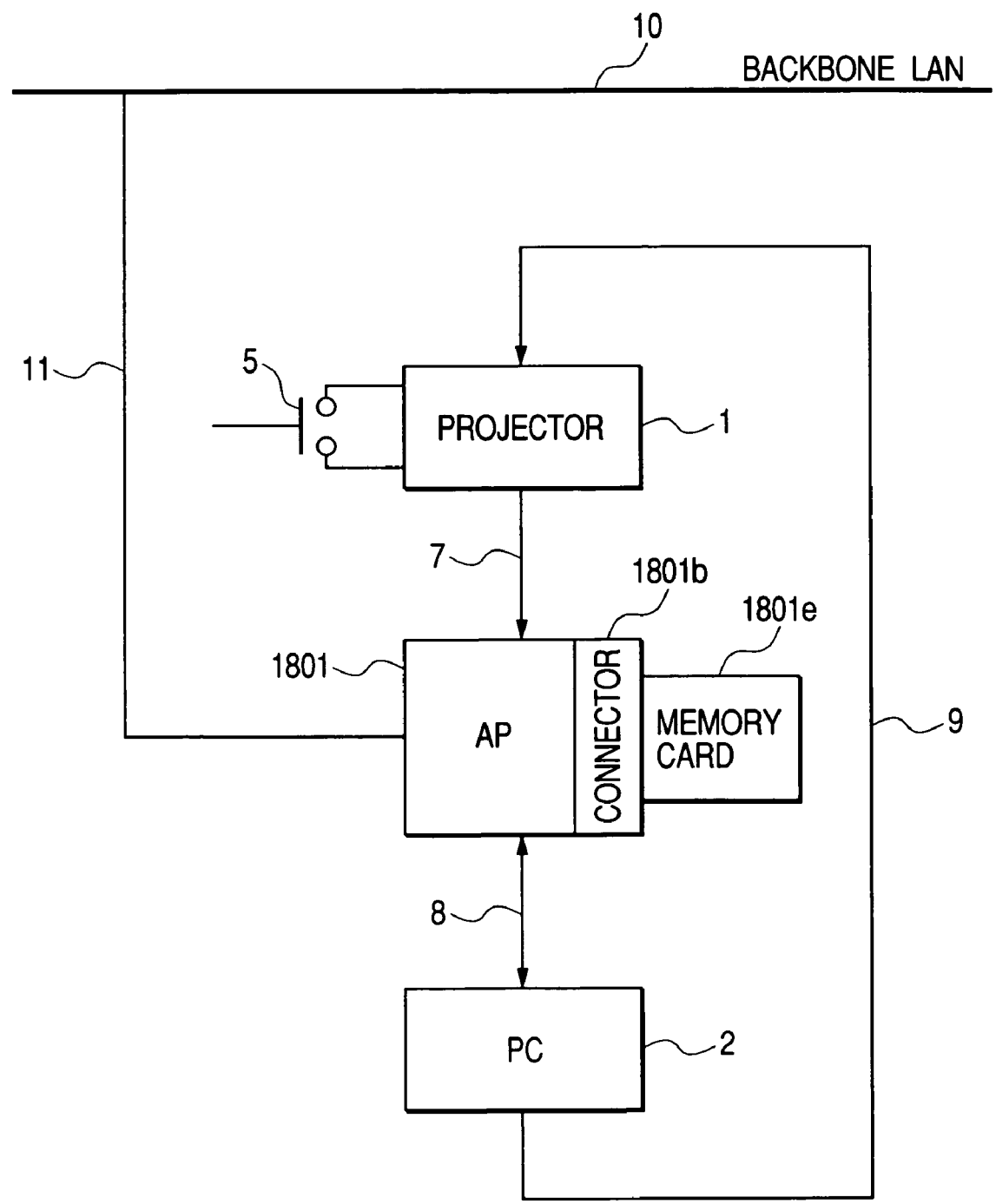
FIG. 20 is a block diagram showing the configuration of the access point device according to the third embodiment of the present invention.

FIG. 20 is a block diagram showing a schematic configuration of the entire display system according to this embodiment.

In FIG. 20, reference numeral 1801 denotes the AP; symbol 1801*b* the connector; reference numeral 1 the projector; 5 the power switch; 2 the PC; and symbol 1801*e* the memory card. A power ON/OFF request signal 7 is sent out from the projector 1 to the AP 1801 as a power ON request signal or a power OFF request signal. Example methods therefor include: a method in which power ON and power OFF are requested when the power ON/OFF request signal 7 is at HIGH level and at LOW level, respectively; and a method of discriminating between the power ON request and the power OFF request based on the kind of pulse train. A LAN signal 8 is used for sending/receiving data through the connection between the PC 2 and the LAN connector 1801*d* of the AP 1801. A video signal 9 is outputted from the PC 2 and inputted to the projector 1. A LAN signal 11 is used for sending/receiving data to/from a server PC (not shown) on the backbone LAN 10 through the connection between the backbone LAN 10 and the LAN connector 1801*c* of the AP 1801.

Figure 21:
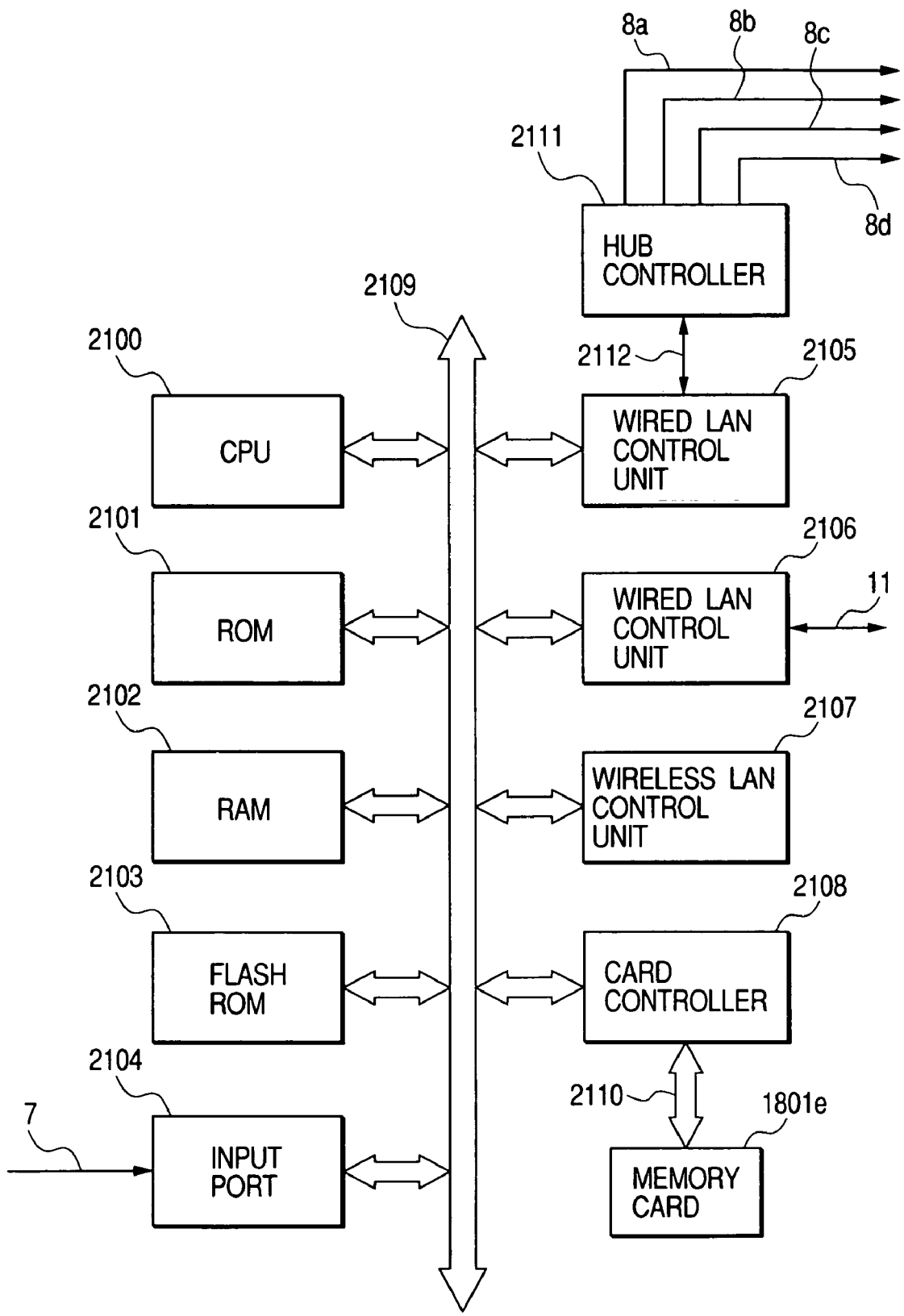
FIG. 21 is another block diagram showing the configuration of the access point device according to the third embodiment of the present invention.

FIG. 21 is a block diagram showing a schematic configuration of the inside of the AP 1801.

In FIG. 21, a CPU 2100 for managing the entire control of the AP 1801 includes a system bus 2109.

Structural components 2101 to 2108 described below are connected to the system bus 2109.

A read-only memory (ROM) 2101 stores a program and various data. A random-access memory (RAM) 2102 is loaded with the program for execution or used as a work area for various purposes. A nonvolatile memory 2103 composed of a FLASH ROM is used for storing network address information of PC 2 and the like. To an input port 2104, the power ON/OFF request signal 7 outputted from the projector 1 is inputted, and the CPU 2100 can read out the state of the power ON/OFF request signal 7 via the input port 2104 and the system bus 2109. A wired LAN control unit 2105 is connected to a hub controller 2111 by a signal 2112. Four outputs 8*a*, 8*b*, 8*c*, and 8*d* from the hub controller 2111 respectively correspond to the four LAN connectors 1801*d* (see FIG. 19). A LAN signal 8*a* being one of the outputs is inputted to the PC 2, and data can be sent/received along the following path: the wired LAN control unit 2105 ⇆ the signal 2112 ⇆ the hub controller 2111 the ⇆ LAN signal 8*a* ⇆ the PC 2.

A wired LAN control unit 2106 allows data to be sent/received by letting the LAN signal 11 be inputted to the backbone LAN 10 (see FIG. 20). A wireless LAN control unit 2107 is used for connecting to a wireless client device (not shown) via the antenna 1801*a* (see FIG. 19). A card controller 2108 is connected to the memory card 1801*e* by a control signal 2110. In other words, the CPU 2100 can access the memory card 1801*e* via the card controller 2108. In addition, the card controller 2108 can detect whether or not the memory card 1801*e* is mounted thereto.

According to the above configuration, under the control of the CPU 2100, the AP 1801 controls the data transfer among the PC 2 connected to the wired LAN control unit 2105 via the hub controller 2111, the server (not shown) on the backbone LAN 10 connected to the wired LAN control unit 2106, and the wireless client device (not shown) connected to the wireless LAN control unit 2107.

The schematic configuration inside the PC 2 is the same as that of the first embodiment described in FIG. 5, and thus its description is omitted.

The schematic configuration inside the projector 1 is also the same as that of the first embodiment described in FIG. 3, and thus its description is omitted.

Figure 22:
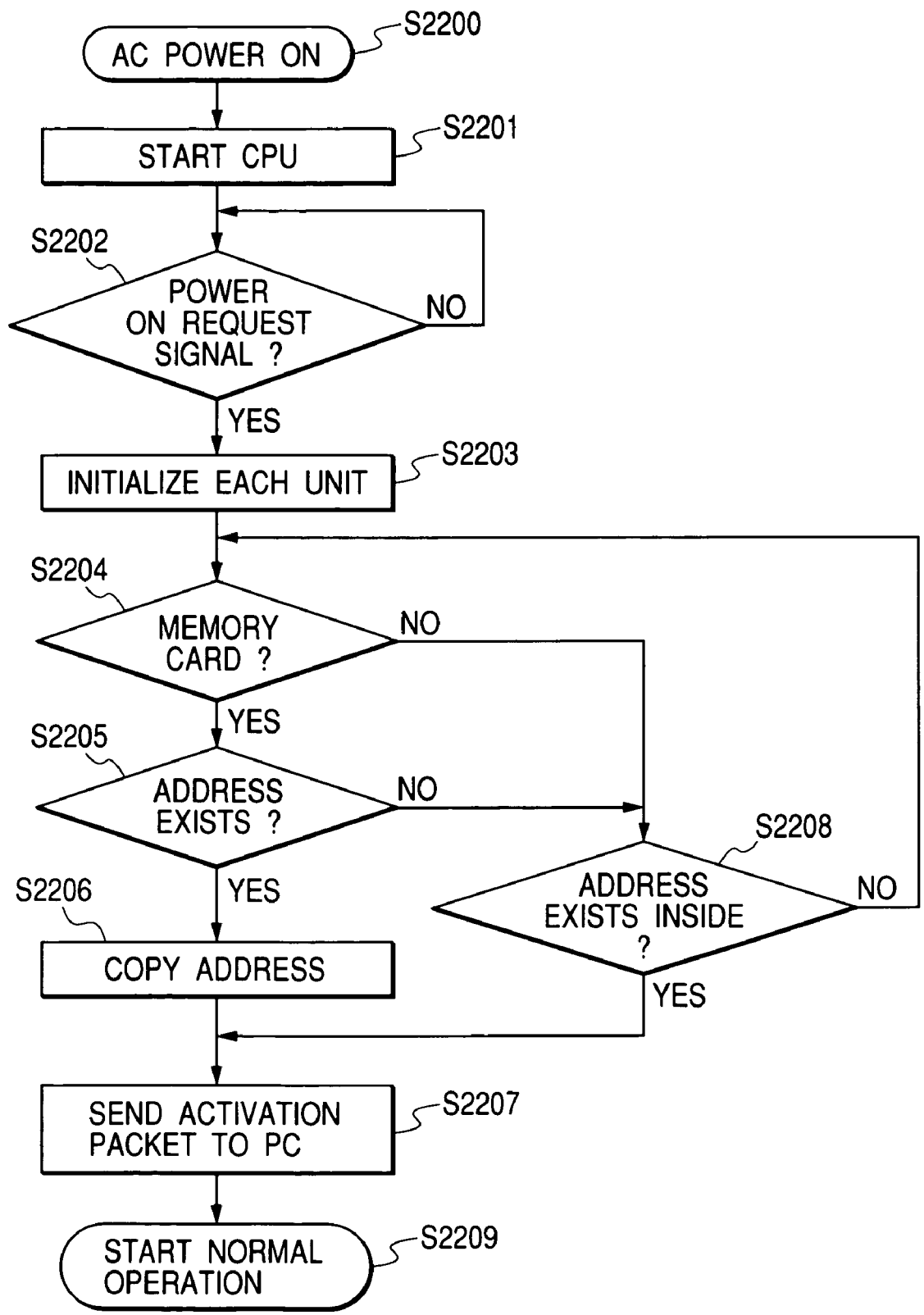
FIG. 22 is a flow chart of an activation process for an access point according to the third embodiment of the present invention.

FIG. 22 is used to describe the operation of the conference system equipped with the access point device and the display system according to this embodiment, which has the above-mentioned configuration.

FIG. 22 is a flow chart showing an operation flow for the AP 1801.

In FIG. 22, first of all, when AC power is supplied to the AP 1801 in step S2200, the CPU 2100 starts in the next step S2201. In that state, the ROM 2101, the RAM 2102, the FLASH ROM 2103, and the input port 2104 are active in the periphery of the CPU 2100.

Subsequently, in the step S2202, the input port 2104 is used to check on the state of the power ON/OFF request signal 7. If the state indicates the power ON request, the process advances to step S2203, and if the state does not indicate the power ON request, the process loops in step S2202. The loop in step S2202 corresponds to the power OFF state after the AC power supply, in which the CPU 2100 operates in the low power consumption mode. What is needed here is only to check on the state of the power ON/OFF request signal 7, so that it is sufficient to check the input port every several tens ms. The description of the low power consumption mode is omitted.

In step S2203, the wired LAN control units 2105 and 2106, the wireless LAN control unit 2107, and the like are initialized and then made active. The process then advances to the next step S2204.

In step S2204, it is checked whether or not the memory card 1801*e* is mounted to the card controller 2108. If the memory card 1801*e* is inserted into the connector 1801*b*, the process advances to step S2205, and if the memory card 1801*e* is not inserted thereinto, the process advances to step S2208.

Figure 23:
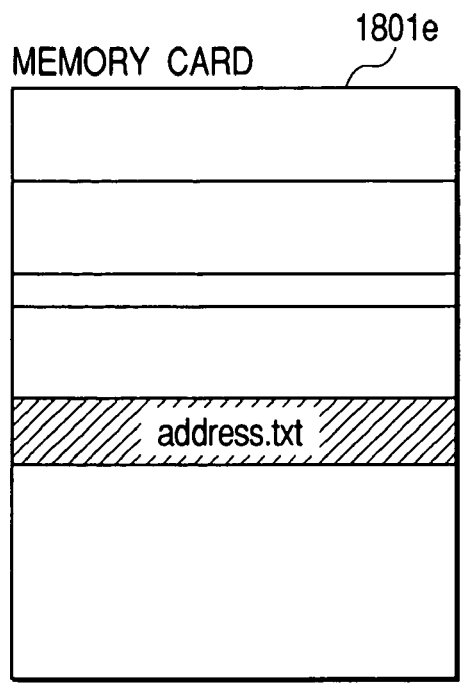
FIG. 23 is a diagram for explaining contents of a memory card according to the third embodiment of the present invention.

In step S2205, as shown in FIG. 23, it is checked whether or not there exists a file with a specific name, a file named "address.txt" here, in the memory card 1801*e*. If the file named "address.txt" exists, the process advances to step S2206, and if it does not exist, the process advances to step S2208.

Figure 24:
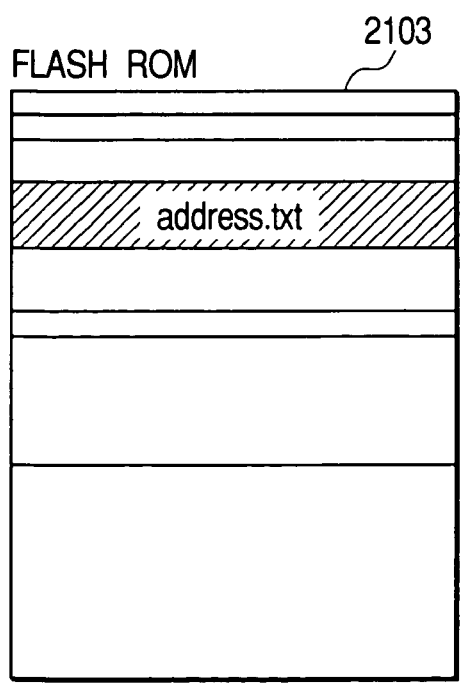
FIG. 24 is a diagram for explaining contents of a memory inside the access point according to the third embodiment of the present invention.

In step S2206, as shown in FIG. 24, the file in the memory card 1801*e* is copied to the FLASH ROM 2103. At this time, if the file "address.txt" already exists in the FLASH ROM 2103, the file in the memory card 1801*e* is copied so as to overwrite the file existing in the FLASH ROM 2103.

Subsequently, in step S2207, the file "address.txt" is opened, and an activation packet is generated so as to contain an address described in the file. The activation packet is sent out from the wired LAN control unit 2105 to a device at the address described in the file "address.txt" via the hub controller 2111 by the signal 2112. Then, the normal operation is started in step S2209.

Figure 25:
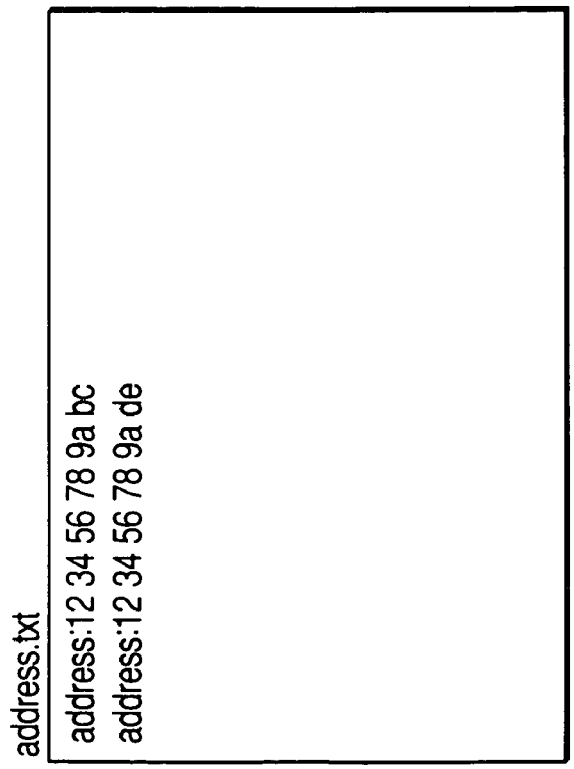
FIG. 25 is a diagram for explaining contents of a file stored in the memory inside the access point according to the third embodiment of the present invention.

FIG. 25 is a diagram showing an example of the file "address.txt". The file is created by an operator using the PC 2, a notebook PC (not shown), or the like, and is written into the memory card 1801*e*. In an initial state, the file is supplied to the AP 1801 by the memory card 1801*e*. A MAC address of the wired LAN control unit 25 of the PC 2 is normally described in the file "address.txt". Thus, the number of the MAC addresses to be described should be one, but can be plural as shown in FIG. 25. In that case, activation packets the number of which corresponds to that of the MAC addresses described in the file "address.txt" are generated to be sent in step S2207. Accordingly, even in the case where a plurality of computers are connected to the hub controller 2111, the MAC addresses of the wired LAN control units of all the computers have been described in the file "address.txt", making it possible to send out the activation packets to all the computers in step S2207.

On the other hand, if no MAC address is described in the file "address.txt", no activation packet is sent out in step S2207, making it possible to stop the Wake on LAN function.

Meanwhile, in step S2208 branched off from steps S2204 and S2205, it is checked whether or not the file "address.txt" exists in the FLASH ROM 2103 as shown in FIG. 24. If the file "address.txt" exists, the activation packet is sent to the PC 2 in step S2207, and then the normal operation is started in step S2209.

The reason why the file "address.txt" exists in the FLASH ROM 2103 is because when the AP 1801 was previously activated, step S2206 was executed to copy the file "address.txt" from the memory card 1801e.

In step S2208, in the case where the file "address.txt" does not exist in the FLASH ROM 2103, the process returns to step S2204. More specifically, in the case where the file "address.txt" does not exist in the FLASH ROM 2103 and the memory card 1801e is not inserted to the connector 1801b, the process loops around steps S2204 and S2208 and waits for the insertion of the memory card 1801e into the connector 1801b by the user.

Alternatively, in the case where the file "address.txt" exists neither in the FLASH ROM 2103 nor in the memory card 1801e even when the memory card 1801e is inserted to the connector 1801b, the process loops around steps S2204, S2205, and S2208 and waits for the replacement by the user with the memory card 1801e in which the file "address.txt" has been written.

Note that the operation of the PC 2 and the operation of the projector 1 are the same as those of the first embodiment, and thus its description is omitted.

As described above, the ganged control is performed in the following order: the projector 1 is activated in response to the depression of the power switch 5 of the projector 1; the power ON request signal is sent out from the projector 1 to the AP 1801; the AP 1801 is activated; the activation packet is sent from the AP 1801 to a PC that is registered in the memory card 1801e or in the FLASH ROM 2103; and the PC is activated.

Since the above configuration uses the memory card 1801e for the supply of the MAC address of the PC 2 to be activated, the activation packet for executing the Wake on LAN function can be sent out from the AP 1801 having no input means. Accordingly, the preparation of another PC is not necessary as the component for sending the activation packet, and the system can be prevented from bloating. In addition, the AP is essential in the case of applying the system to the electronic conference system or the like, no new structural component is necessary.

Further, the configuration includes means for instructing to turn ON/OFF the power of the AP 1801, and allows the activation packet to be sent out to the PC 2 based on the power ON/OFF instruction. Accordingly, ganged activation can be performed on the AP 1801 and the PC 2.

Further, the configuration includes the power switch 5 of the projector 1, and allows the power ON/OFF request signal to be sent out from the projector 1 to the AP 1801 and the activation packet to be sent from the AP 1801 to the PC 2 on the LAN. Accordingly, the system can be realized, in which only one power switch 5 gangs the power control of the system, thereby making it unnecessary to access the inside of the projector 1 even in the case where the PC 2 and the AP 1801 are disposed inside the casing of the projector 1.

Further, by checking that the video signal 9 is outputted from the PC 2 to the projector 1 upon the activation, the normal ganged power control can be confirmed. In contrast, it is possible that an abnormal state is detected, and an error message is displayed on the projector 1 at the time of abnormality, thereby realizing the system that can notify the user of the occurrence of an error.

Fourth Embodiment

Hereinafter, a fourth embodiment will be described with reference to the drawings.

Figure 26:
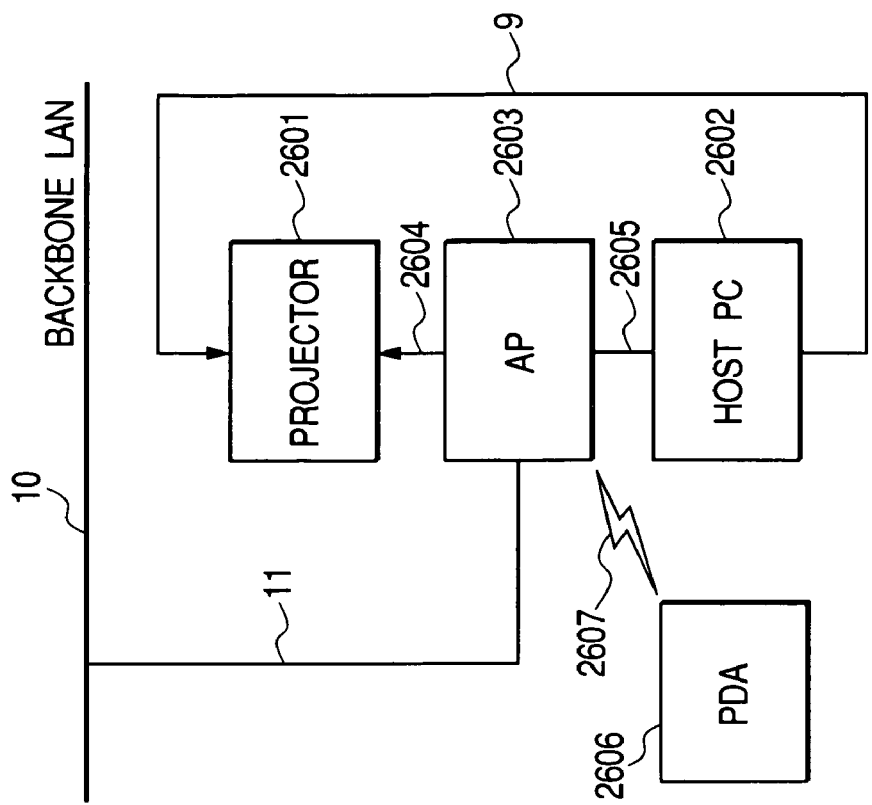
FIG. 26 is a block diagram showing a configuration of the display system according to the fourth embodiment of the present invention.

FIG. 26 is a block diagram showing a configuration of a display system according to this embodiment.

In FIG. 26, reference numeral 2601 denotes a projector; 2602 a host PC; 2603 an AP; and 2606 a PDA serving as a client terminal operated by a conference participant. A wireless LAN signal 2607 is used for sending/receiving data through the connection between the AP 2603 and the PDA 2606. A wired LAN signal 2605 is used for sending/receiving data through the connection between the host PC 2602 and the AP 2603. A video signal 9 is outputted from the host PC 2602 and inputted to the projector 2601. A wired LAN signal 11 is used for sending/receiving data to/from a server PC (not shown) on the backbone LAN 10 through the connection between the backbone LAN 10 and the AP 2603. An ON/OFF request signal 2604 serving as a control signal is sent out from the AP 2603 to the projector 2601 as a power ON request signal or a power OFF request signal. Example methods therefor include: a method in which power ON and power OFF are requested when the power ON/OFF request signal 2604 is at a HIGH level and at a LOW level, respectively; and a method of discriminating between the power ON request and the power OFF request based on the kind of pulse train.

Figure 27:
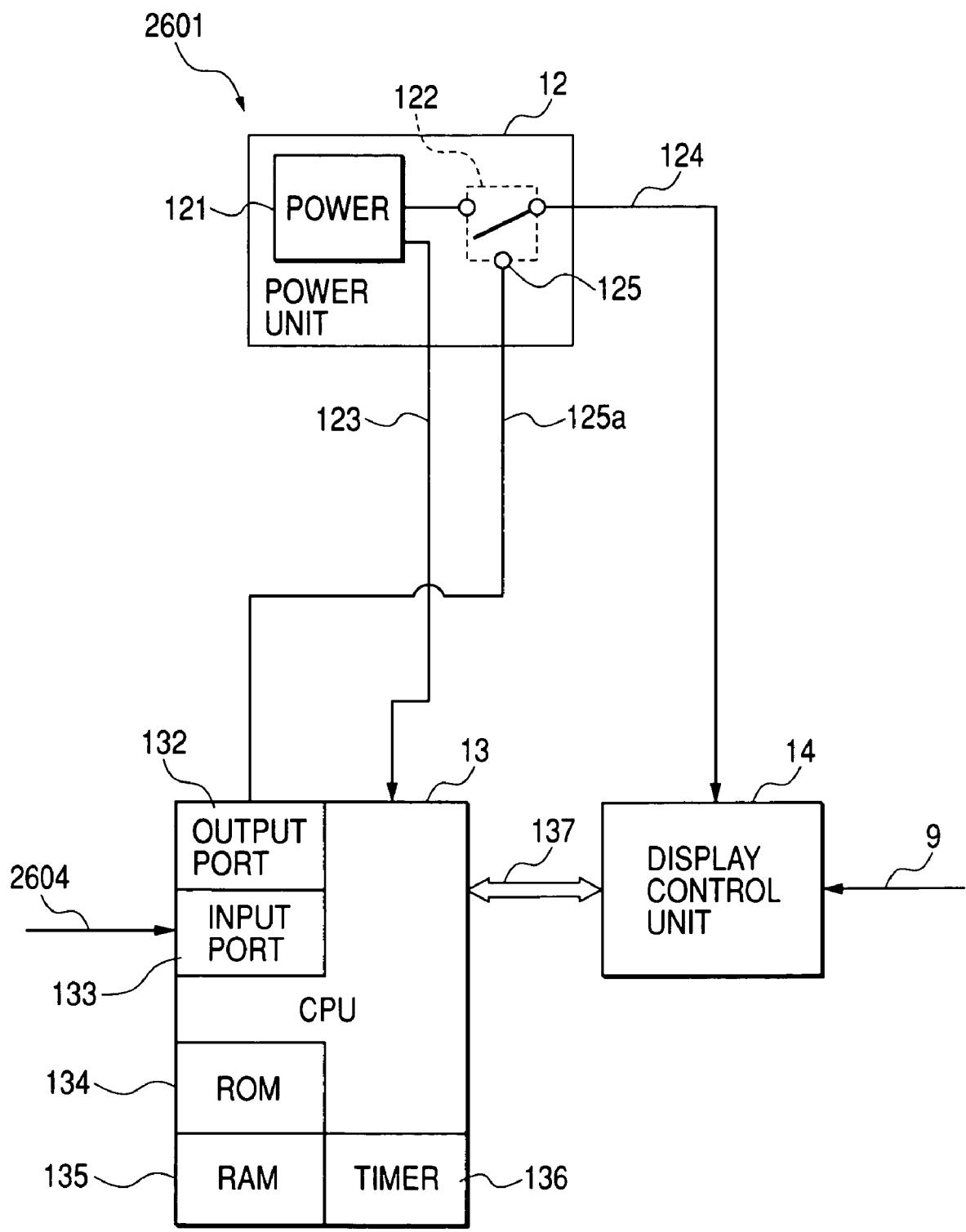
FIG. 27 is a block diagram showing a configuration of a projector according to a fourth embodiment of the present invention.

FIG. 27 is a block diagram showing a configuration of the projector 2601 and including only the portions involved in this embodiment.

In FIG. 27, the power unit 12 includes: the switching power supply 121; the switch 122 for turning ON/OFF main power; standby power 123 outputted automatically when AC power is supplied; main power 124; and a control terminal 125 for the switch 122. The CPU 13 composed of a one-chip microcomputer includes: the output port 132; the input port 133; the ROM 134 storing a program, various data, an error message, and the like; the RAM 135 in which the program is loaded for execution or which is used as a work area for various purposes; the timer 136; and the system bus 137. Here, the standby power 123 is supplied to the CPU 13 in such a manner that when the AC power is supplied to the projector 2601, the standby power 123 is outputted to start the CPU 13. The main power 124 is supplied to the respective units (not shown) including the display control unit 14. The control terminal 125 for controlling the ON/OFF of the main power 124 is connected to the output port 132 of the CPU 13, and turns ON/OFF the main power 124 under the control of the CPU 13. The input port 133 is connected by the ON/OFF request signal 2604 from the AP 2603 to allow the polling of a signal state. The display control unit 14 to which the video signal 9 is inputted from the host PC 2602 is connected to the CPU 13 via the system bus 137 to be operated under the control of the CPU 13.

Figure 28:
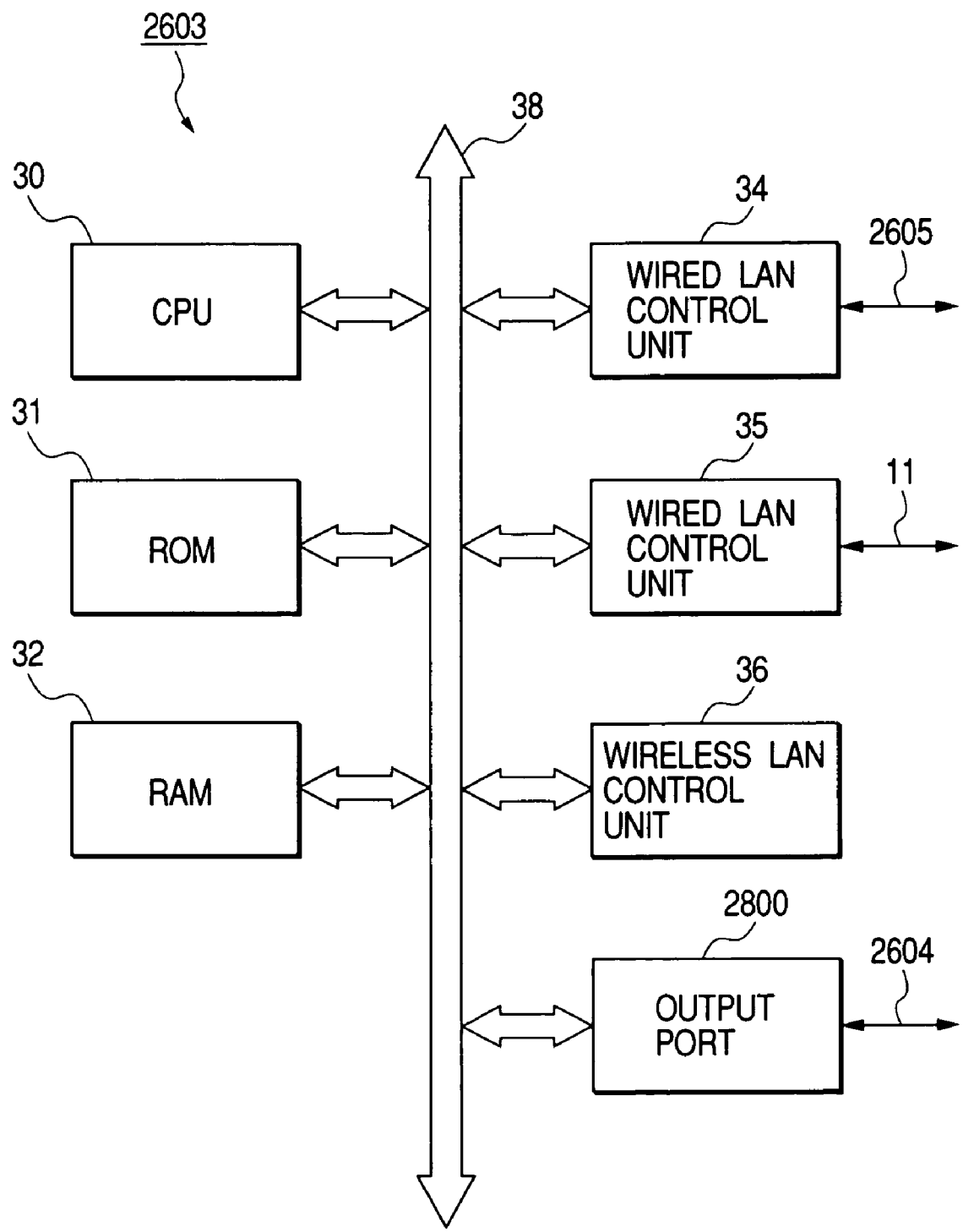
FIG. 28 is a block diagram showing a configuration of an access point according to the fourth embodiment of the present invention.

FIG. 28 is a block diagram showing a configuration of the AP 2603.

In FIG. 28, the CPU 30 managing the entire control of the AP 2603 includes a system bus 38. Reference numeral 32 denotes a RAM in which a program is loaded for execution or which is used as a work area for various purposes; and 31 a ROM storing a program and various data. A rewritable nonvolatile element such as a FLASH ROM or an EEPROM is used in at least a part of the ROM 31 for storing various settings of the AP 2603. Thus, even if the power of the AP 2603 is shut off, the various settings are not nullified. An output port 2800 outputs the ON/OFF request signal 2604 to the projector 2601 under the control of the CPU 30. The wired LAN control units 34 and 35 are connected to the host PC 2602 by the wired LAN signal 2605 and to the backbone LAN 10 by the wired LAN signal 11, respectively, allowing data to be sent/received. The wireless LAN control unit 36 is used for connecting to the PDA 2606 being the wireless client device. Under the control of the CPU 30, the AP 2603 controls the data transfer among the host PC 2602 connected to the wired LAN control unit 34, the server (not shown) on the backbone LAN 10 connected to the wired LAN control unit 35, and the wireless client device connected to the wireless LAN control unit 36.

The configuration of the host PC 2602 is the same as that of the first embodiment described in FIG. 5, and thus its description is omitted.

Figure 29:
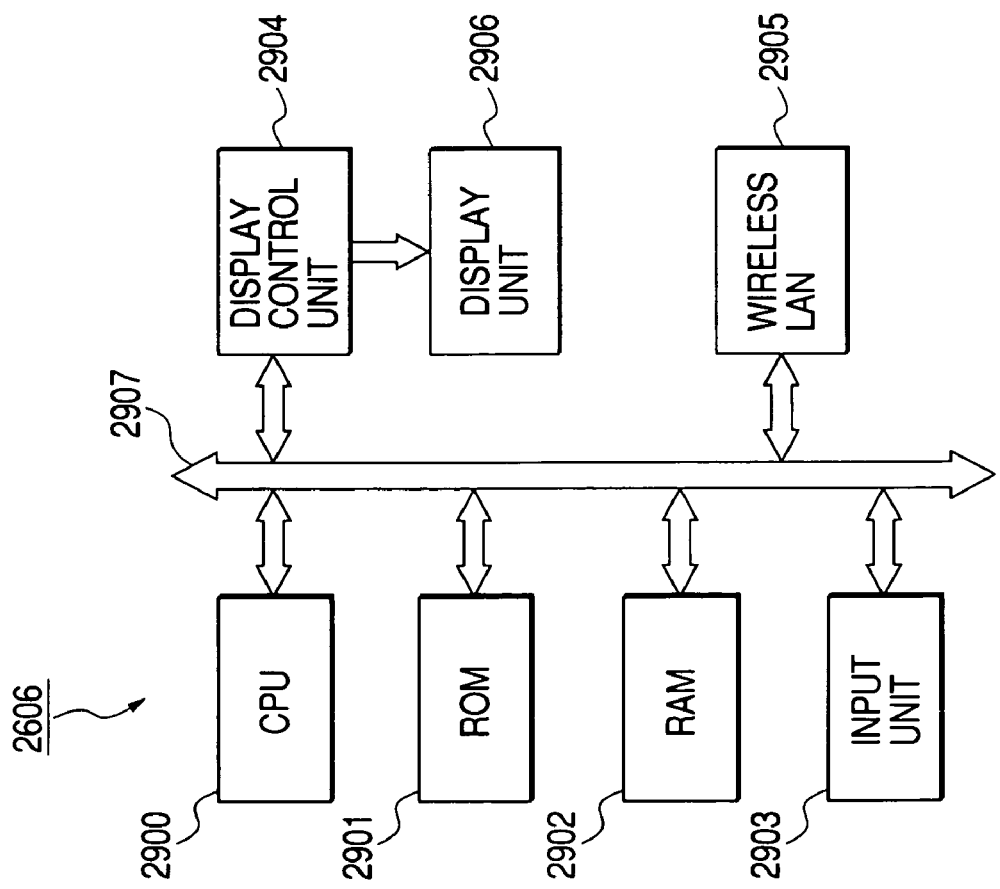
FIG. 29 is a block diagram showing a configuration of a PDA according to the fourth embodiment of the present invention.

FIG. 29 is a block diagram showing a configuration of the PDA 2606.

In FIG. 29, a CPU 2900 managing the entire control of the PDA 2606 includes a system bus 2907. Structural components 2901 to 2905 described below are connected to the system bus 2907. Reference numeral 2902 denotes a RAM in which a program is loaded for execution or which is used as a work area for various purposes; and 2901 a ROM storing a program and various data. Similarly to the ROM 31 of the AP 2603, the rewritable nonvolatile element such as a FLASH ROM or an EEPROM is used in at least a part of the ROM 2901 for storing programs or various settings of the PDA 2606. An input unit 2903 is composed of a touch panel and an input key. A display control unit 2904 performs display in a display unit 2906 composed of a liquid crystal display under the control of the CPU 2900. A wireless LAN control unit 2905 is used for connecting to the AP 2603.

The overall configuration of the display system according to this embodiment is as described above. Next, detailed description will be made of the operation of the display system.

First, description is made of the operation upon the activation of the system.

Figure 30:
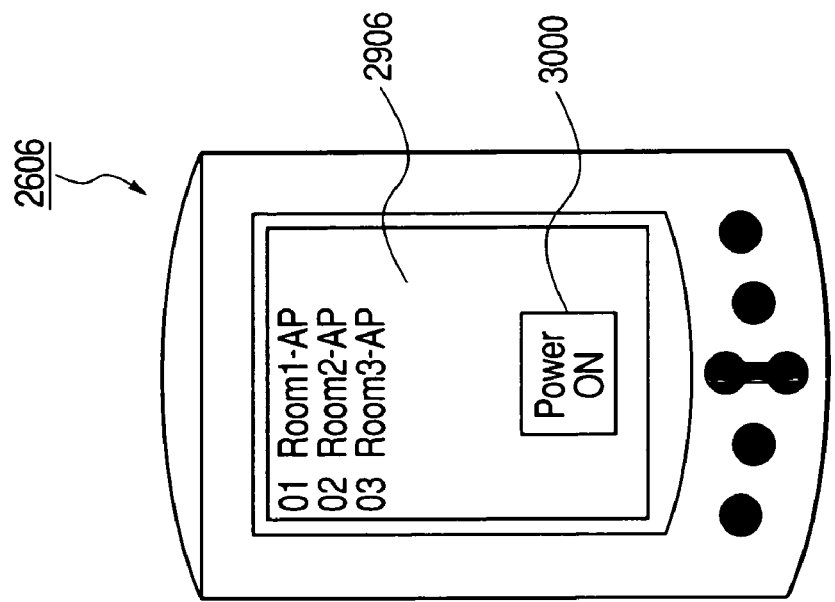
FIG. 30 is a diagram showing a screen display example during execution of a program for allowing a user to instruct activation of the system by use of the PDA according to the fourth embodiment of the present invention.

Turning ON and shutdown for the display system according to this embodiment can be instructed by one step of operation of the PDA 2606. FIG. 30 is a screen display example during execution of a program for allowing a user to instruct activation of the system by use of the PDA 2606, which is displayed in the display unit 2906. The program is activated when the entire system is activated by the user.

In FIG. 30, "01", "02", and "03" indicate the names of APs. FIG. 30 shows a screen for selecting a target access point (AP) when there exist a plurality of systems according to this embodiment. The names need to be registered in a nonvolatile portion of the ROM 2901 in advance. In the example of FIG. 30, three APs, that is, Room1-AP, Room2-AP, and Room3-AP, have been registered as "01", "02", and "03", respectively. The name of an AP 2603 needs to be set in the AP 2603 before the registration in the PDA 2606, and the name of a conference room in which the AP 2603 is installed is preferably used for a part of the name of the AP 2603 to make it easy to discriminate the name. Practically, in order to activate the system, the touch panel (input unit 2903) is tapped on a portion in which the target AP is displayed, followed by the tap of a "Power ON" button. By the operation, an activation instruction is sent from the wireless LAN control unit 2905 of the PDA 2606 to the AP 2603 by the wireless LAN signal 2607. That is, wireless connection is established to the AP 2603, and an activation instructing command is sent by the wireless LAN signal 2607.

Figure 31:
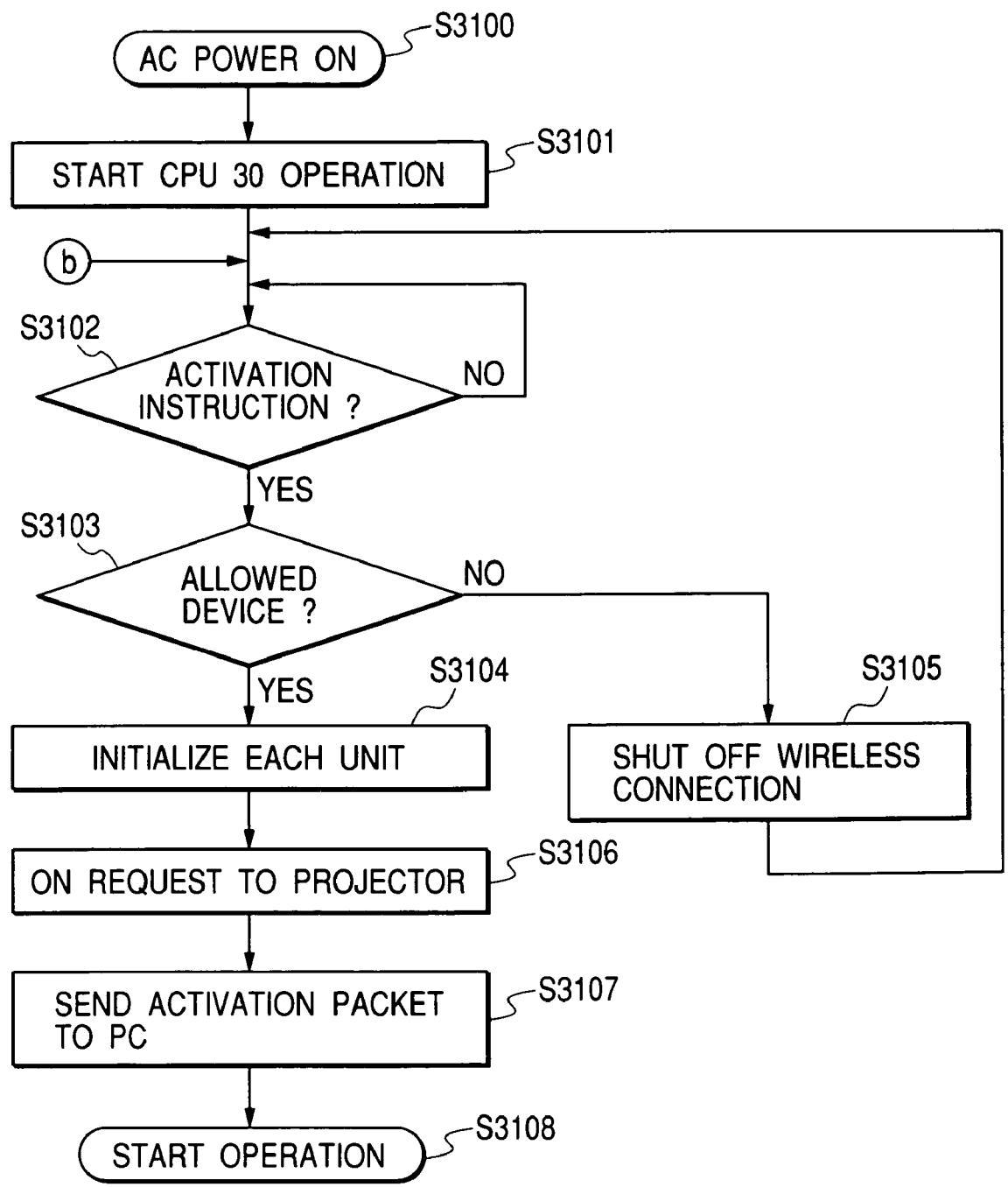
FIG. 31 is a flow chart of an activation process for the access point according to the fourth embodiment of the present invention.

FIG. 31 is a flow chart showing initial operation of the AP 2603 according to this embodiment.

The initial operation is started at the time when AC power is supplied to the AP 2603 in step S3100. When the AC power is supplied, the CPU 30 starts in step S3101. In that state, only the ROM 31, the RAM 32, and the wireless LAN control unit 36 are active in the periphery of the CPU 30.

In the following step S3102, the wireless LAN control unit 36 is used to check whether or not the activation instructing command has been sent by the wireless LAN signal 2607. If the activation instructing command has been sent, the process advances to step S3103, and if the activation instructing command has not been sent, the process loops in step S3102. The loop in step S3102 corresponds to the power OFF state after the AC power supply, in which the CPU 30 operates in the low power consumption mode.

In step S3103, it is checked whether or not the device sending the activation instructing command is an allowed device for the activation instruction. More specifically, for example, a MAC address of the allowed device for the activation instruction is set and stored in the nonvolatile portion of the ROM 31 in advance, and it is checked from the comparison whether or not the MAC address matches a MAC address of the device sending the activation instructing command, which is here a MAC address of the wireless LAN control unit 2905 of the PDA 2606. If they match, the process advances to step S3104, and if they do not match, the wireless connection to the PDA 2606 is shut off in step S3105, and then the process returns to step S3102.

In step S3104, the output port 2800, the wired LAN control units 34 and 35, and the like are initialized and then made active. The process then advances to step S3106. In step S3106, the ON/OFF request signal 2604 in the ON request state is sent out to the projector 2601, and then the process advances to step S3107. In step S3107, an activation packet compatible with Wake on LAN is sent from the wired LAN control unit 34 to the PC 2602 by the wired LAN signal 2605. The normal operation is then started (step S3108).

Figure 32:
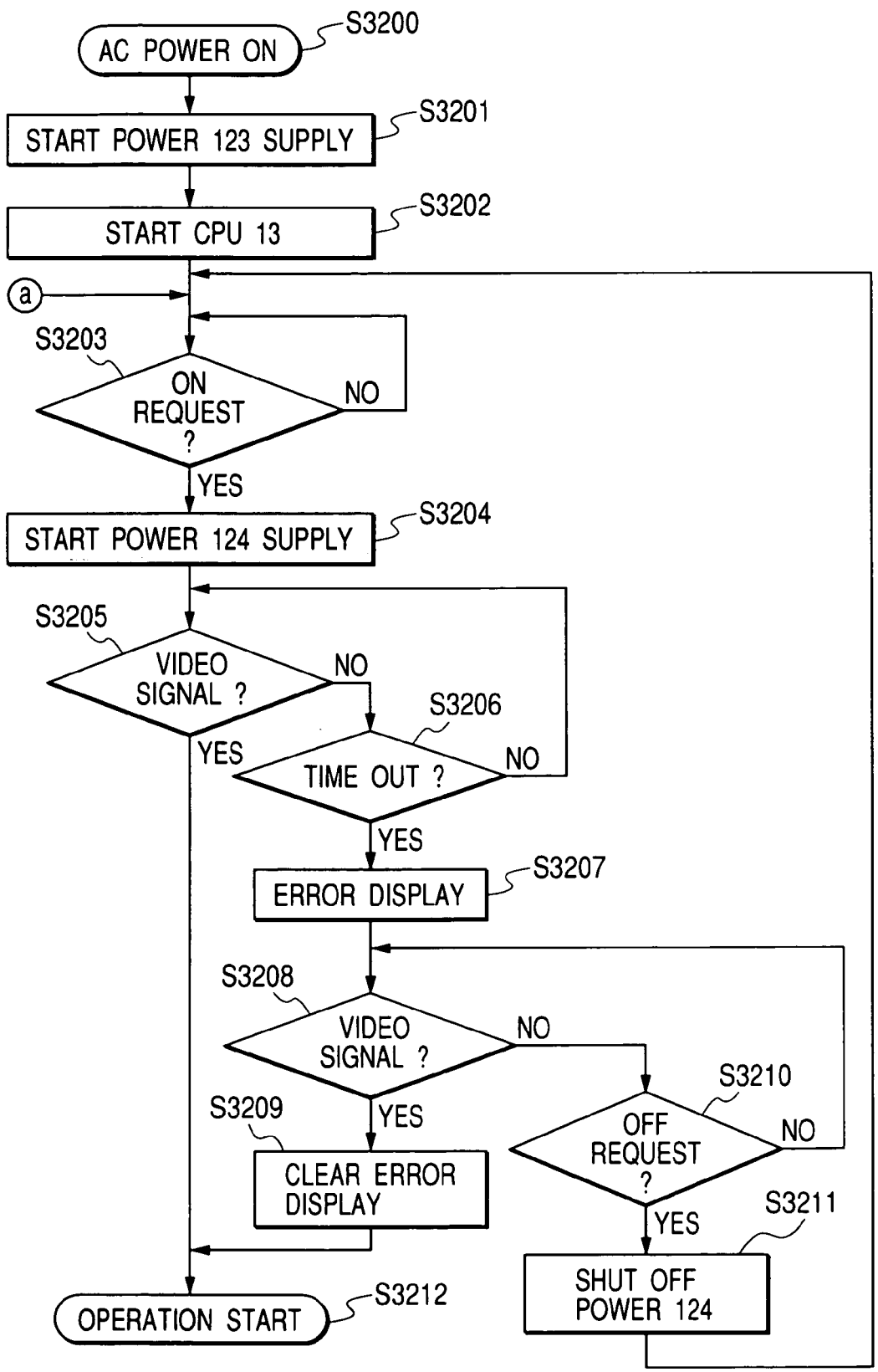
FIG. 32 is a flow chart of an activation process for the projector according to the fourth embodiment of the present invention.

FIG. 32 is a flow chart showing initial operation of the projector 2601 according to this embodiment.

The initial operation is started at the time when AC power is supplied to the projector 2601 in step S3200. When the AC power is supplied, the standby power 123 is supplied to the CPU 13 in step S3201 to start the CPU 13 (step S3202). The started CPU 13 reads out the state of the ON/OFF request signal 2604 via the input port 133 in step S3203, and waits until the ON request state is read out. That is, the process loops in step S3203 until the ON request signal is outputted from the AP 2603, and upon the reception of the ON request signal, the process advances to step S3204. The loop in step S3203 corresponds to the power OFF state after the AC power supply, in which the standby power 123 is supplied and the main power 124 is not supplied.

If the process advances to step S3204 upon the reception of the ON request signal, the CPU 13 operates the output port 132 to turn ON the switch 122 of the power unit 12, and starts to supply the main power 124 to the respective units of the projector 2601. In step S3205, it is checked whether or not the video signal 9 has been sent out from the host PC 2602 to the display control unit 14. If the video signal 9 has been sent out, the process advances to step S3212 to start normal operation for displaying the video signal 9 from the host PC 2602. From the fact that the video signal 9 has been sent out from the host PC 2602 in step S3205, it is confirmed that the power to the host PC 2602 is turned ON to start the operation successfully. If the video signal 9 has not been sent out, the process advances to step S3206.

In step S3206, the timer 136 inside the CPU 13 is used to measure time for a predetermined time period (for example, 2 minutes). More specifically, if the measured time is within 2 minutes, the process returns to step S3205 and loops around steps S3205 and S3206, and if the measured time exceeds 2 minutes, the process advances to step S3207. The fact that a time-out period of 2 minutes elapses to reach step S3207 means that the host PC 2602 has not been judged to normally operate for some reason. In step S3207, the display control unit 14 is thus controlled to display in the display area 4 of the projector 2601 an error message that reads as, for example, "Receiving no video signal. Please check on your personal computer". After that, the process advances to step S3208.

In step S3208, the checking on the video signal 9 is again performed. In the case where the user has eliminated the cause of the error after reading the error message in step S3207, the video signal 9 starts to be sent out from the host PC 2602. The process then advances to step S3209 to clear the error display, and the normal operation is then started in step S3212.

In the case where the video signal 9 has not been sent out in step S3208, the process advances to step S3210 to check whether or not the ON/OFF request signal 2604 indicates the OFF request. If not the OFF request, the process returns to step S3208. That is, the process loops around steps S3208 and S3210 until the video signal 9 is sent out or the OFF request is received. Upon the reception of the OFF request, the power 124 is shut off by the output port 132 in step S3211, and the process returns to step S3203.

During the loop in step S3203, the projector 2601 is thus in the power OFF state. As described above, if the video signal 9 is sent out, the projector 2601 performs the normal operation, and if the video signal 9 is not sent out even after the predetermined time period, the error message is displayed. Further, if the video signal 9 is sent out after the display of the error message, the normal operation is performed after clearing the error message, and if the OFF request is received, the power is controlled to be turned OFF.

As to step S3203, the projector 2601 is judged to be in the power ON request state based on step S3106 of FIG. 31. More specifically, the AP 2603 receives an activation instruction from an allowed PDA 2606 for the activation instruction (steps S3102 and S3103), and the ON request signal is sent to the projector 2601 in step S3106, which causes the projector 2601 receiving the ON request signal to detect the ON request signal in step S3203 and execute the succeeding steps.

The operation of the host PC 2602 at the activation is the same as that of the first embodiment described in FIG. 8, and thus its description is omitted.

It is understood from the above description that the ganged control is performed in the following order: the activation instruction is received from the PDA 2606; the AP 2603 is activated; the activation packet is sent from the AP 2603 to the host PC 2602 and the ON request is sent out from the AP 2603 to the projector 2601; and the host PC 2602 is activated and the projector 2601 is activated (completes the activation after the activation of the host PC 2602).

Next, description will be made of operation performed when the entire system is terminated.

FIG. 33 is a screen display example during execution of a program for allowing a user to instruct termination of the system by use of the PDA 2606, which is displayed in the display unit 2906. The difference from the example of FIG. 30 is that a "Power OFF" button is used instead of the "Power ON" button. When the user is to shut down the entire system, the program is activated and a touch panel (input unit 3300) is tapped on a portion in which a target AP is displayed, followed by a termination instruction performed by tapping on the "Power OFF" button. By the operation, the termination instruction is sent from the wireless LAN control unit 2905 of the PDA 2606 to the AP 2603 by the wireless LAN signal 2607. In general, in the case of using the system for an electronic conference or the like, the wireless connection has already been established between the PDA 2606 and the AP 2603, so that a termination instruction command is sent to the AP 2603 by the wireless LAN signal 2607. If the wireless connection has not been established yet, the termination instruction command is sent by the wireless LAN signal 2607 after the establishment of the wireless connection.

FIG. 34 is a flow chart showing termination operation of the AP 2603 according to this embodiment.

The termination operation is started at the time when the termination instruction command is received from the PDA 2606 (step S3400). Upon receiving the termination instruction command by the wireless LAN control unit 36, in step S3401, the CPU 30 checks whether or not the device sending the termination instruction command is an allowed device for the termination instruction. More specifically, a MAC address of the allowed device for the termination instruction is set and stored in the nonvolatile portion of the ROM 31 in advance, and it is checked from the comparison whether or not the MAC address matches a MAC address of the device sending the termination instruction command, which is here a MAC address of the wireless LAN control unit 2905 of the PDA 2606. This is the same step as step S3103 of FIG. 31, and the same device is usually allowed for both the activation instruction and the termination. If they match in step S3401, the process advances to step S3402, and if they do not match, the process returns to a main flow (not shown) that invoked the program (step S3405).

In step S3402, the ON/OFF request signal 2604 is sent out to the projector 2601 in the OFF request state, and the process advances to step S3403. In step S3403, the wired LAN control unit 34 is controlled to send a predetermined termination packet to the host PC 2602. The termination operation is then performed in step S3404. This operation inactivates the wired LAN control units 34 and 35, the output port 2800, and the like. After the termination, the process returns to step S3102 of FIG. 31. The loop in step S3102 corresponds to the power OFF state as described above.

The operation of the host PC 2602 at the termination according to this embodiment is the same as that of the first embodiment described in FIG. 11, and thus its description is omitted.

Figure 35:
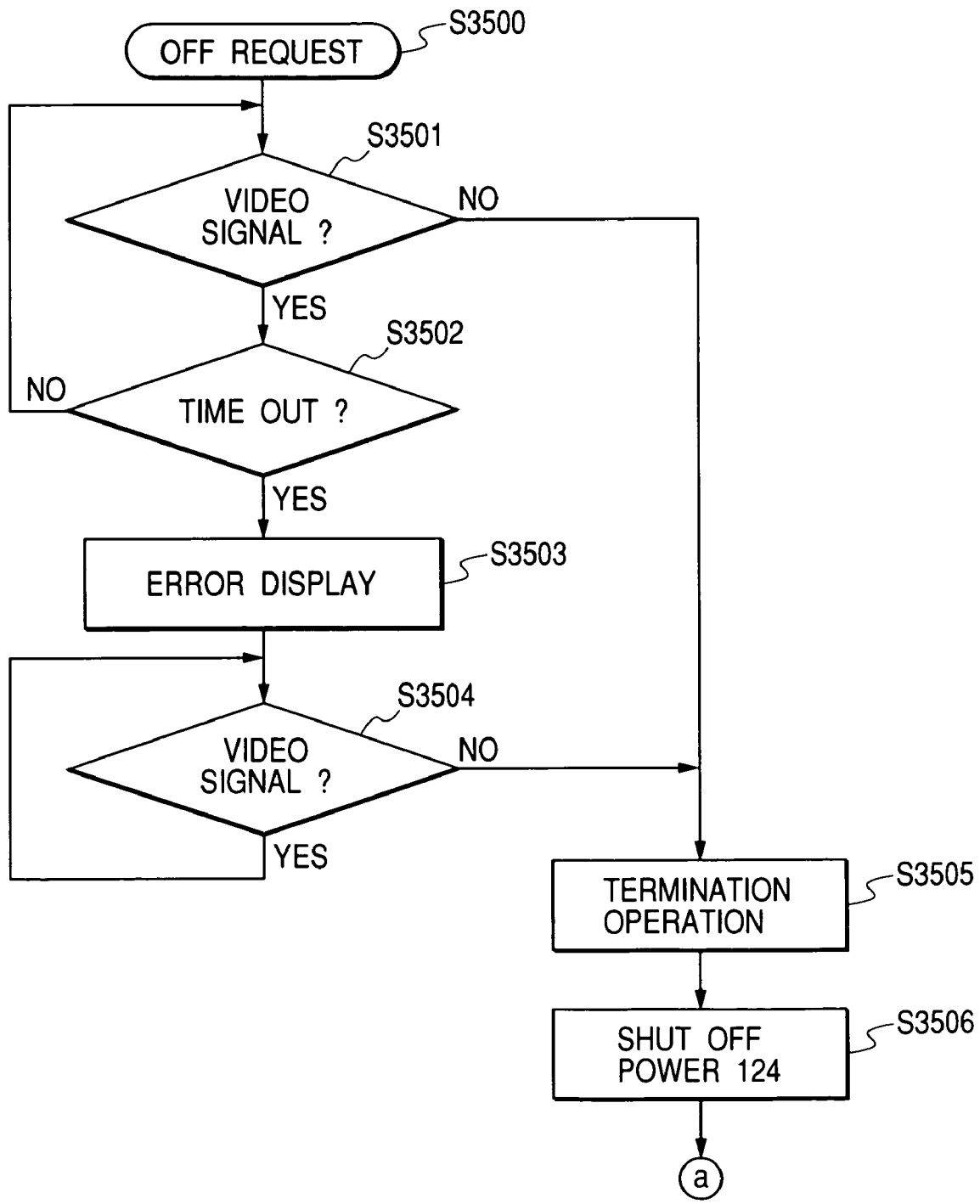
FIG. 35 is a flow chart of a shutdown process for the projector according to the fourth embodiment of the present invention.

FIG. 35 is a flow chart showing termination operation of the projector 2601 according to this embodiment.

The termination operation is started in association with step S3402 of FIG. 34 (step S3500). Upon receiving the OFF request signal from the AP 2603, the projector 2601 checks on the video signal 9 in step S3501. If the video signal 9 is no longer received, the process advances to step S3505 to perform the termination operation of the projector 2601. The fact that the video signal 9 is no longer received from the host PC 2602 in step S3501 means that the host PC 2602 has received the termination packet from the AP 2603 and has been terminated successfully. If the video signal 9 is still being received, the process advances to step S3502.

In step S3502, the timer 136 inside the CPU 13 is used to measure time for a predetermined time period (for example, 2 minutes). More specifically, if the measured time is within 2 minutes, the process returns to step S3501 and loops around steps S3501 and S3502, and if the measured time exceeds 2 minutes, the process advances to step S3503. The fact that a time-out period of 2 minutes elapses to reach step S3503 means that the host PC 2602 has not been judged to normally operate for some reason. In step S3503, the display control unit 14 is thus controlled to display in the display area of the projector 2601 an error message that reads as, for example, "Your personal computer has not been shut down. Please check". After that, the process advances to step S3504.

In step S3504, the checking on the video signal 9 is again performed. In the case where the user has eliminated the cause of the error after reading the error message in step S3503, the host PC 2602 is terminated and no longer sends the video signal 9. The process also advances to step S3505 to perform the termination operation of the projector 2601. After the completion of the termination operation in step S3505, the process advances to the step S3506 to shut off the power 124 by use of the output port 132, and then returns to step S3203. The loop in step S3203 corresponds to the power OFF state as described above.

As described above, if the video signal 9 stops being received within the predetermined time period, the projector 2601 performs the termination operation, and if the video signal 9 is still received after the predetermined time period, the error message is displayed. Further, the checking is performed on the video signal 9 even after the display of the error message, and if the video signal 9 stops being received, the projector 2601 also performs the termination operation. That is, if the video signal 9 is still received, the projector 2601 waits instead of performing termination operation, and if the video signal 9 stops being received, the termination operation is executed.

It is understood from the above description that the ganged control is performed in the following order: the termination instruction is received from the PDA 2606; the termination packet is sent from the AP 2603 to the host PC 2602 and the OFF request is sent out from the AP 2603 to the projector 2601; and the host PC 2602 is terminated and the projector 2601 is terminated (after the termination of the host PC 2602).

As has been described hereinabove, this embodiment is configured such that the AP 2603 receives the activation/termination instruction command from the PDA 2606 via the wireless LAN, the ON/OFF request signal is sent out from the AP 2603 to the PDA 2606, and the activation/termination packet is sent from the AP 2603 to the host PC 2602. Therefore, the system can be realized, which makes it possible to gang the power supplies of the AP 2603, the host PC 2602, and the projector 2601. Accordingly, even in the case where the host PC 2602 and the AP 2603 are disposed inside the casing of the projector 2601, it becomes unnecessary to access the inside of the projector 2601.

Further, by checking that the video signal has been outputted from the host PC 2602 to the projector 2601 upon the activation and by checking that the video signal has stopped being sent from the host PC 2602 to the projector 2601 upon the termination, the normal ganged power control can be confirmed. In contrast, it is possible that an abnormal state is detected, and an error message is displayed on the projector 2601 at the time of abnormality, thereby realizing the system that can notify the user of the occurrence of an error.

Further, by limiting the PDA receiving the activation/termination instruction command to a specific PDA whose MAC address has been registered, thereby realizing the system having such high security as to limit the operator who can activate the system.

In this embodiment, the activation/termination instruction command is sent between the PDA 2606 and the AP 2603 via the wireless LAN. However, various means can be used here such as IEEE 802.11, 802.11b, or 802.11a, and wireless connection means can be used such as Bluetooth (BT). In the case of the wireless LAN, the PDA is discriminated based on its MAC address, and it is judged whether or not the activation/termination instruction command is to be received, but in the case of Bluetooth, a BT address may be used for discrimination. In other words, in order to discriminate a client device, a physical address of its wireless unit may be used without problems.

Further, the above description has been made regarding the PDA as a client terminal. However, portable devices would maintain their convenience, so that a notebook PC, a mobile phone, and the like can be used. Note that in the above respective embodiments, the ON/OFF request signal is sent via the wired line, or the ON/OFF command is sent via the wireless circuit by the BT signal, between the projector and the AP, but there is no limitation thereto as far as the signal for controlling the activation or termination of the power supplied from the projector to the AP or the ON/OFF request signal from the AP to the projection can be sent. For example, other wired connection means such as serial connection or USB connection or various wireless means such as 802.11 can be used.

Further, in the above projector and PC, the standby power and the main power are supplied via the different wired lines from a single power supply. However, the standby power and the main power may be supplied from different power supplies.

Further, in the above respective embodiments, the AP is described by the example case where the power is not shut off. However, similarly to the standby power supply 123 and main power 124 described as the power of the projector 1 and the PC 2, the power may be separated according to whether or not the power is shut off.

Further, the above respective embodiments are described by the example where a rear projector is used as the display and the AP and the PC are disposed inside the casing, but there is no limitation thereto. The present invention can be applied to displays such as, for example, a front projector, a cathode-ray tube (CRT), a liquid crystal display, and a plasma display. There are many cases where the AP and the PC cannot be built into the display. In those cases, instead of the power switch of the projector causing the ganged control to activate the projector, the AP, and the PC in order, the configuration may provide the power switch to the AP such that the power switch causes the ganged control to activate the AP and the PC in order. At the same time, the configuration may be such that the power ON/OFF request signal is sent out from the AP to the projector to cause the ganged control to activate the AP and the projector in order.

Further, the third embodiment is described by the example where the file containing the MAC address is copied from the memory card 1801e to the FLASH ROM 2103 inside the AP 1801 to be used. However, instead of the FLASH ROM 2103, the file may be copied to various nonvolatile memories such as an EEPROM and a RAM backed up with a battery or to a storage device such as a hard disk drive. Alternatively, the file may be read out every time from the memory card 1801e without the copying.

Further, the third embodiment is described by the example where the MAC address is described in the specific file named "address.txt", but of course any name may be used. Alternatively, instead of using a file format, the configuration may be such that a specific location is defined in the memory card 1801e, a MAC address written in the location is read out, and the MAC address is copied to a predetermined internal memory at a specific address.

Further, the standby power 123, the main power 124, and the power supplied through the wired lines 271 and 272 described in the above embodiments are not limited to a single power output, but may be composed of plural kinds of power outputs.

The software programs for realizing the functions of the above embodiments is supplied to the CPUs of the respective devices, and the supplied program is read out and executed by the respective CPUs. Accordingly, the present invention can be attained.

In that case, the program is supplied directly from a storage medium storing the program, or supplied by being downloaded from another computer, database, or the like (not shown) connected to the Internet, a commercial network, a local area network, or the like.

The program may be composed of a form such as an object code, a program code to be executed by an interpreter, and a script data to be supplied to the operating system (OS).

The storage medium storing the program code according to this embodiment is ROM, but there is no limitation thereto. For example, there can be used a RAM, an NV-RAM, a floppy (trade name) disk, a hard disk, an optical disk, a magneto-optical disk, a CD-ROM, an MO, a CD-R, a CD–RW, a DVD-ROM, a DVD-RAM, a DVD–RW, a DVD+RW, a magnetic tape, a nonvolatile memory card, etc.

The functions of the above embodiments can be realized not only when the program code read out from the computer is executed, but also when the OS operating on the computer or the like performs a part or all of actual processes based on the instructions of the program code.

Hereinabove, description has been made of the present invention by showing various examples and embodiments. However, it can be understood by one skilled in the art that the gist and the scope of the present invention are not limited to the specific descriptions and drawings in this specification, but include all various modifications and variations described in the scope of the claims appended hereto.

What is claimed is:

1. A control method of an electronic conference system including an information apparatus, a display apparatus for displaying a video signal from the information apparatus, and an a wireless access point apparatus that connects to network and can communicate with the information apparatus and the display apparatus, the method comprising
a power-off process of turning off powers of the wireless access point apparatus and the information apparatus them in response to a power-off operation at the display apparatus,
wherein the power-off process includes a display process of displaying an error message by the display apparatus when the display apparatus is detecting a video signal from the information apparatus even after a predetermined time elapses from the power-off operation, nevertheless the display apparatus performs the power off process.

2. A display system comprising:
a client terminal;
a host computer apparatus;
a wireless access point apparatus for performing communication between the client terminal and the host computer; and
a display apparatus for displaying a video signal from the host computer apparatus, wherein:
the wireless access point apparatus includes a sending means for sending request signals for requesting power-off to the host computer apparatus and the display apparatus, respectively, in response to a shutdown instructing signal from the client terminal,
the host computer apparatus and the display apparatus each include a power control means for turning off a power in response to the request signal from the wireless access point apparatus,
the display apparatus includes:
a discrimination means for discriminating a reception state of the video signal from the host computer apparatus in order to discriminate whether or not the host computer apparatus has turned off the power by the request signal from the wireless access point apparatus; and
a notification means for notifying a user by displaying that the power of the host computer apparatus is not turned off, in a case where the display apparatus is detecting a video signal from host computer apparatus regardless of whether a predetermined time elapsed after receiving from the wireless access point apparatus a request signal of turning off the power, and
the display apparatus discriminates the reception state of the video signal from the host computer apparatus by the discrimination means during notification by the notification means, and turns off the power by the power control means in a case where the discrimination means discriminates that the video signal from the host computer apparatus is not received.

3. A control method of a display system including a client terminal, a host computer apparatus, a wireless access point apparatus for performing communication between the client terminal and the host computer apparatus, and a display apparatus for displaying a video signal from the host computer apparatus, wherein:
the wireless access point apparatus sends request signals for requesting power off to the host computer apparatus and the display apparatus, respectively, in response to a shutdown instructing signal from the client terminal,
the host computer apparatus turns off a power in response to the request signal from the wireless access point apparatus,
the display apparatus
discriminates a reception state of the video signal from the host computer apparatus in order to discriminate whether or not the host computer apparatus has turned off the power by the request signal from the wireless access point apparatus,
notifies a user by displaying information indicating that the host computer apparatus is not turned off, in a case where the display apparatus is detecting a video signal from host computer apparatus regardless of whether a predetermined time elapsed after receiving from the wireless access point apparatus a request signal of turning off the power,
discriminating the reception state of the video signal from the host computer apparatus during displaying information indicating that the host computer apparatus is not turned off, turns off the power in a case where the video signal from the host computer is not received after displaying the information that indicating the host computer is not turned off.

4. An electronic conference system comprising:

a display apparatus for displaying a video signal from an information processing apparatus; and a wireless access point apparatus that can communicate with the information processor processing apparatus and the display apparatus, wherein:

the display apparatus includes:

- a first sending means for sending a first activation instructing signal to the wireless access point apparatus in response to a power-on operation at the display apparatus; and
- a second sending means for sending a first shutdown instructing signal to the wireless access point apparatus in response to a power-off operation of the display apparatus;

the wireless access point apparatus includes:

- a first activation start means for starting first activation processing which supplies a power supplied to only a part of the wireless access point apparatus to respective parts thereof in response to detection of the first activation instructing signal;
- a third sending means for sending a second activation instructing signal to the information processing apparatus upon the first activation processing;
- a first shutdown start means for starting first shutdown processing which supplies a power supplied to respective parts of the wireless access point apparatus to only a part thereof when the first shutdown instructing signal is detected; and
- a fourth sending means for sending a second shutdown instructing signal to the information processing apparatus upon the first shutdown processing;

the information processing apparatus includes:

- a second activation start means for starting second activation processing which switches a supply power to the information processing apparatus from a standby power to a main power in response to detection of the second activation instructing signal; and
- a second shutdown start means for starting second shutdown processing which switches the supply power from the main power to the standby power in response to detection of the second shutdown instructing signal; and the display apparatus further includes a display means for displaying a error message when the display apparatus is detecting a video signal from the information processing apparatus even after a first time elapses from the power-off operation at the display apparatus.

5. An electronic conference system according to claim 4, wherein the display means displays an error message when a video signal from the information processing apparatus is not detected until a second time elapses from the power-on operation at the display apparatus.

6. An electronic conference system according to claim 4, wherein the display apparatus switches the display apparatus to the power-off state when a video signal from the information processing apparatus is not detected.

7. An electronic conference system according to claim 4, wherein the display apparatus and the wireless access point apparatus are wirelessly communicated with each other.

* * * * *